(12) United States Patent
Karito et al.

(10) Patent No.: US 8,619,332 B2
(45) Date of Patent: Dec. 31, 2013

(54) APPARATUS, METHOD, AND STORAGE MEDIUM FOR IMPROVING PRINT QUALITY OF AN IMAGE

(75) Inventors: Nobuhiro Karito, Suwa (JP); Masaki Hayashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 622 days.

(21) Appl. No.: 12/623,342

(22) Filed: Nov. 20, 2009

(65) Prior Publication Data
US 2010/0128288 A1 May 27, 2010

(30) Foreign Application Priority Data
Nov. 27, 2008 (JP) ................................ 2008-302383

(51) Int. Cl.
G06K 1/00 (2006.01)
G06K 15/22 (2006.01)
H04N 1/58 (2006.01)
B41J 2/21 (2006.01)
G06F 15/00 (2006.01)

(52) U.S. Cl.
USPC ............. 358/3.12; 358/1.2; 358/1.3; 358/1.4; 358/1.8; 358/1.9; 358/1.18; 358/3.11; 347/9; 347/14; 347/43

(58) Field of Classification Search
USPC ............ 358/1.2, 1.3, 1.4, 1.8, 1.9, 1.18, 3.11, 358/3.12; 347/9, 14, 43
See application file for complete search history.

(56) References Cited

U.S. PATENT DOCUMENTS

| 6,290,330 B1 * | 9/2001 | Torpey et al. ................... 347/43 |
| 6,406,111 B1 * | 6/2002 | Klassen et al. ..................... 347/9 |
| 2006/0098037 A1 * | 5/2006 | Torpey et al. ................... 347/14 |
| 2007/0064031 A1 | 3/2007 | Nakano et al. |

FOREIGN PATENT DOCUMENTS

| JP | 09-066618 A | 3/1997 |
| JP | 11-005298 A | 1/1999 |
| JP | 2007-118238 A | 5/2007 |
| JP | 2008-067259 A | 3/2008 |
| JP | 2009-039880 A | 2/2009 |

\* cited by examiner

*Primary Examiner* — Fred Guillermety
(74) *Attorney, Agent, or Firm* — Kilpatrick Townsend & Stockton LLP

(57) ABSTRACT

Provided is a printing apparatus that prints an image of a first colorimetric system that is constructed with a plurality of pixels by using dots having a plurality of sizes, including: a print head that ejects a printing material to form the dots on a printing medium; a color conversion unit that converts the image in the first colorimetric system to an intermediate image in a second colorimetric system that can be printed by the printing apparatus; a detection unit that detects edge pixels, which constitute an edge of the intermediate image, among a plurality of pixels constituting the intermediate image; a dot allocation unit that allocates dots having a predetermined size among the dots having the plurality of sizes to the edge pixels; and a printing unit that controls the print head based on printing data indicating the dot allocation to form the image on the printing medium.

7 Claims, 15 Drawing Sheets

4(HORIZONTAL) × 11(VERTICAL)

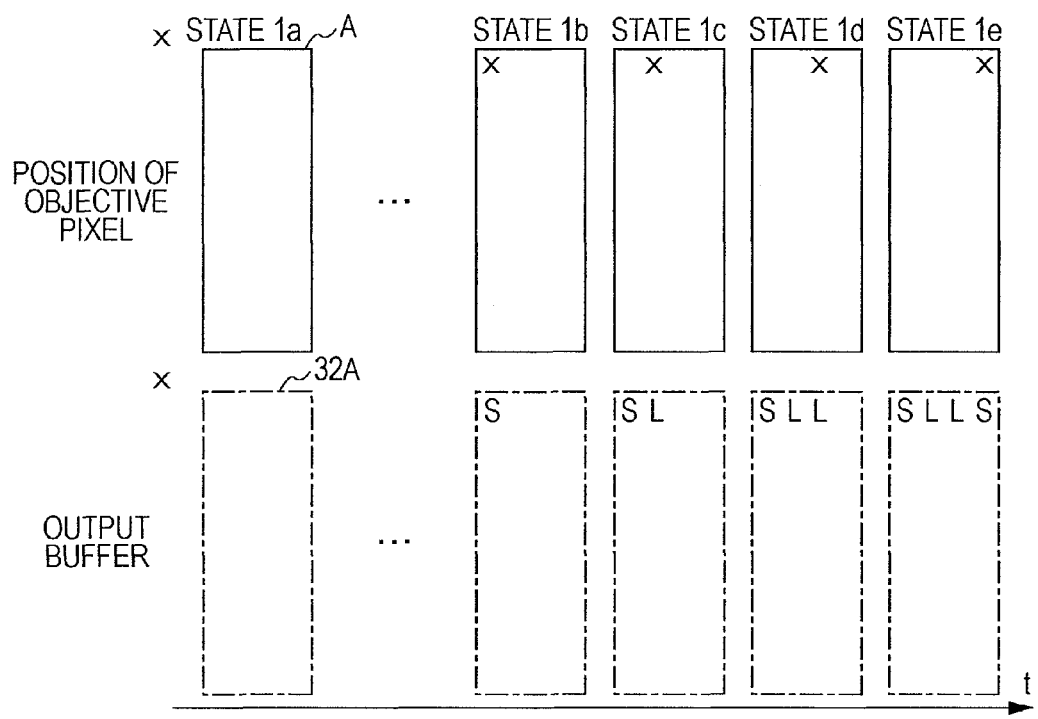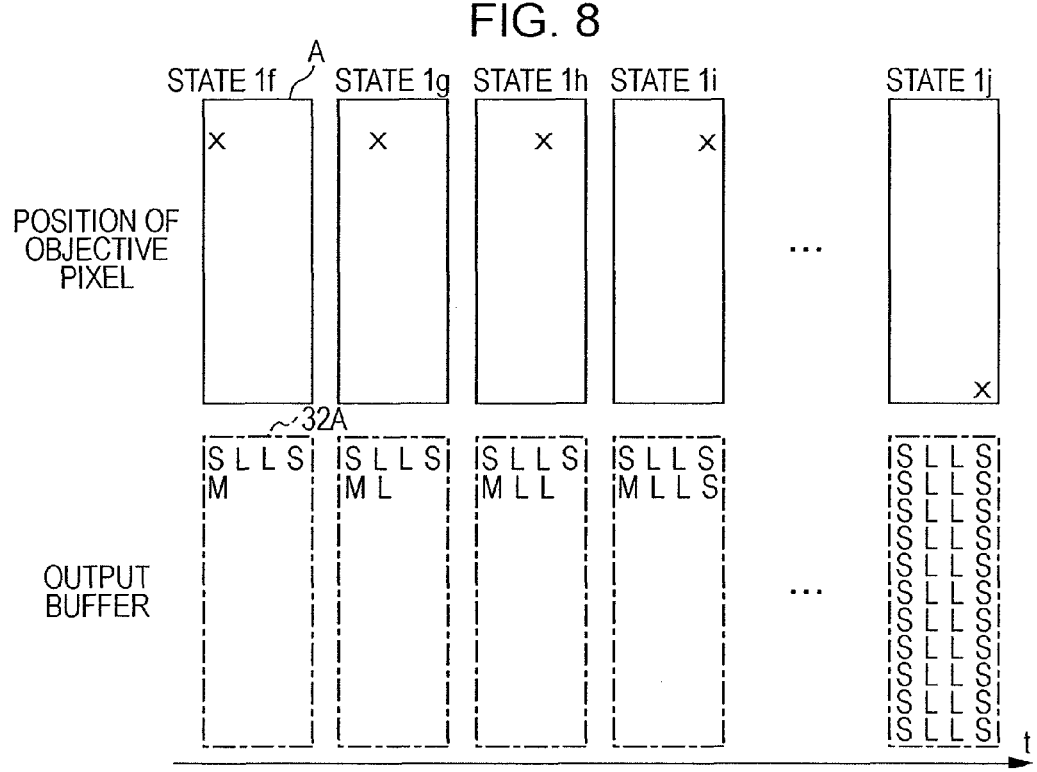

| M |
|---|
| M |
| M |
| M |
| M |

| M | M |
|---|---|
| M | M |
| M | M |
| M | M |
| M | M |

| M | L | M |
|---|---|---|
| M | L | M |
| M | L | M |
| M | L | M |
| M | L | M |

| S | L | L | S |
|---|---|---|---|
| S | L | L | S |
| S | L | L | S |
| S | L | L | S |
| S | L | L | S |

TD TABLE DATA

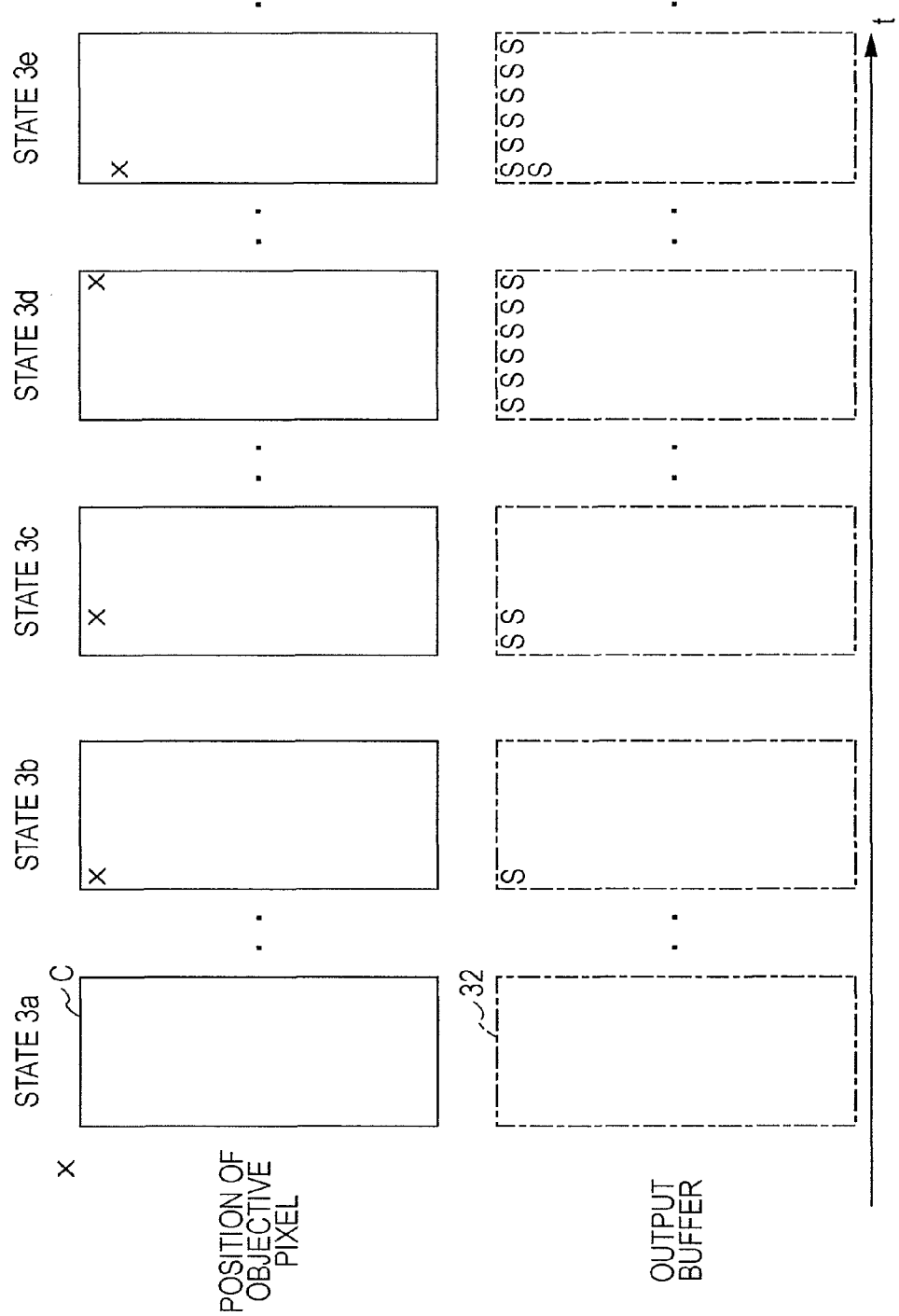

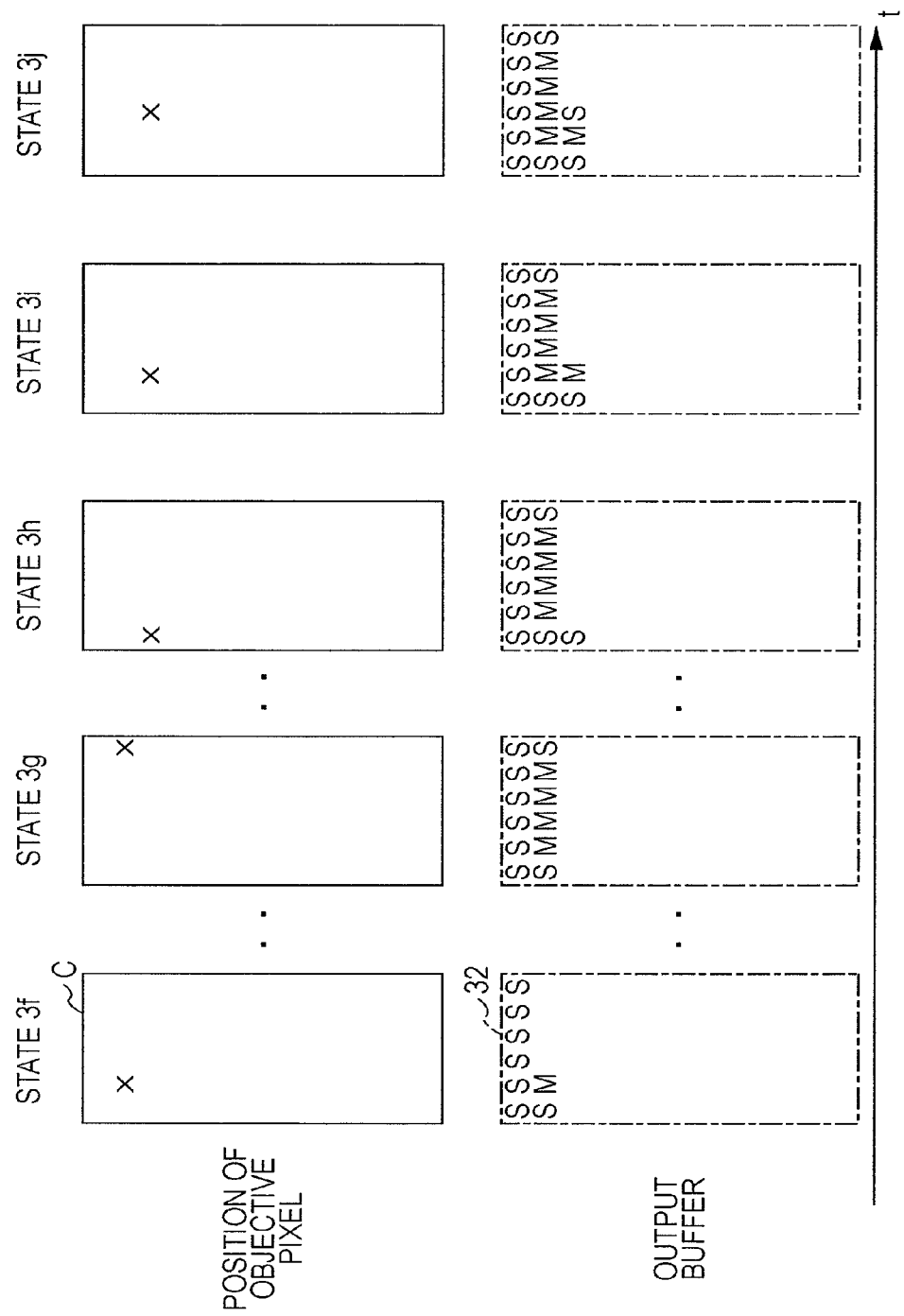

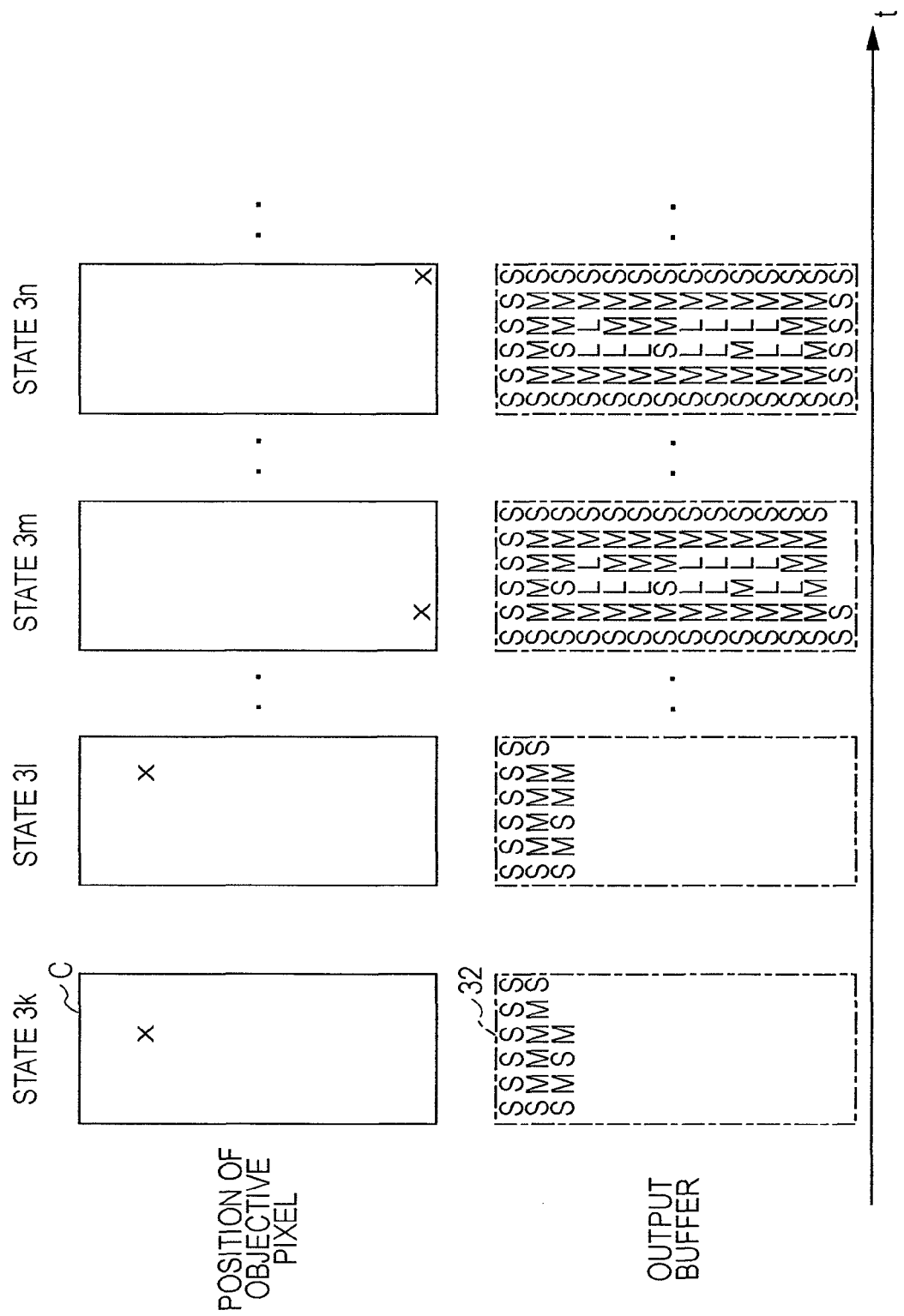

APPARATUS, METHOD, AND STORAGE MEDIUM FOR IMPROVING PRINT QUALITY OF AN IMAGE

This application claims priority to Japanese Patent Application No. 2008-302383, filed Nov. 27, 2008, the entirety of which is incorporated by reference herein.

BACKGROUND

1. Technical Field

The present invention relates to an image process of determining a dot formed state at the time of printing an image constructed with a plurality of pixels by using dots having a plurality of sizes.

2. Related Art

An ink jet printer is known as a printing apparatus that prints an image by forming dots on various printing media such as paper, a cloth, and a film. The ink jet printer prints the image on the printing medium by forming the ink dots on the printing medium by ejecting inks of colors, for example, cyan (C), magenta (M), yellow (Y), and black (K). In addition, there is an ink jet printer that can form dots having a plurality of sizes, for example, large dots (L dot), medium dots (M dots), and small dots (S dots).

In general, at the time of printing the image by using the ink jet printer, a process of determining the dot formed state of each of the printing pixels (referred to as a halftone process) is performed based on image data representing the image (refer to, for example, JP-A-2007-118238). Herein, the phrase "determining the dot formed state of each of the printing pixels" denotes determining which size and which color of the dot is formed at each of the printing pixels or determining whether no dot is formed.

In some cases, in the halftone process, there may be a limitation in a total amount of ink per unit area of the printing medium in order to suppress the occurrence of color bleeding. In this case, at the printing pixels constituting the edge portion of, for example, a character or a line drawing in the image, the dots having different sizes may be mixed, or no dot may be formed at some of the printing pixels. Therefore, due to the blurring or voids of the edge, the printing quality may deteriorate.

In addition, these problems are not limited to the printing of the image by the ink jet printer. Theses problems commonly occur at the time of determining the dot formed states of the printing pixels in the printing of the image by using the dots.

SUMMARY

An advantage of some aspects of the invention is to provide a technology capable of determining dot formed states of printing pixels so as to improve printing quality.

The invention is contrived so as to solve at least a portion of the aforementioned problems. The invention can be implemented as the following aspects or application examples.

Application Example 1

According to an aspect of the invention, there is provided a printing control apparatus controlling a printing apparatus that prints an image of a first colorimetric system that is constructed with a plurality of pixels by using dots having a plurality of sizes, comprising: a color conversion unit that converts the image in the first colorimetric system to an intermediate image in a second colorimetric system that can be printed by the printing apparatus; a detection unit that detects edge pixels, which constitute an edge of the intermediate image, among a plurality of pixels constituting the intermediate image; and a dot allocation unit that allocates dots having a predetermined size among the dots having the plurality of sizes to the edge pixels.

According to the printing control apparatus of Application Example 1, the dot allocation can be performed on the intermediate image expressed in the second colorimetric system that can be printed by the printing apparatus so that the edge pixels are detected and the dots having the predetermined sizes are formed at the positions on the printing medium corresponding to the edge pixels. Therefore, the dots having almost uniform size can be formed in the edge so as to be aligned. Accordingly, the blurring or voids in the edge can be suppressed, so that the printing quality can be improved.

Application Example 2

In the printing control apparatus of Application Example 1, the second colorimetric system is configured with a plurality of color components that are used to print by the printing apparatus, wherein the color conversion unit generates the intermediate image for each color component, wherein the detection unit detects the edge pixels for each color component, and wherein the dot allocation unit allocates the dots having the predetermined size to the edge pixels for each color component. According to the printing control apparatus of Application Example 2, the detecting of the edge pixels and the allocation of the dots having the predetermined sizes thereto are performed for each color component. Therefore, even in the case of the pixels where the dots having a plurality of colors are mixed, the color bleeding of ink can be suppressed.

Application Example 3

In the printing control apparatus of Application Example 2, the detection unit detects pixels having a predetermined concentration, which is defined for each color component in advance, among the plurality of pixels constituting the intermediate image as the edge pixels. In general, the dots having a relatively large size among a plurality of sizes can be allocated to the pixels having the maximum concentration, the color bleeding may easily occur. Therefore, according to the printing control apparatus of Application Example 3, the dot allocation can be performed on the pixels having the predetermined concentration. Accordingly, there is no need to perform the determination on all the pixels whether the pixels are the edge pixels, so that the printing quality can efficiently be improved with a low processing load.

Application Example 4

In the printing control apparatus of any of Application Examples 1 to 3, at least one of the print head ejecting the printing material and the printing medium is allowed to be moved in a predetermined direction, so that the image is formed on the printing medium, and wherein the detection unit detects the edge pixels, which constitute an edge in the predetermined direction and a direction intersecting the predetermined direction, among the pixels constituting the intermediate image. In general, it is generally known that the highly-visible color bleeding or blurring in the edge in the direction in which the print head is moving and in the direction in which the printing medium is transported is perceived by a human's eyes. According to the printing control apparatus of Application Example 4, the pixels constituting the edge in the direction in which the print head is moving and in the direction in which the printing medium is transported are detected as the edge pixels. Accordingly, the highly-visible color bleeding of the dots in the edge portion can be suppressed.

Application Example 5

In the printing control apparatus of any of Application Examples 1 to 4, the detection unit detects edge adjacent pixels, which have maximum concentrations of the color components and which are located in a predetermined distance from the edge pixels, among the plurality of pixels constituting the intermediate image, and wherein the dot allocation unit allocates dots having a size, which is defined according to a distance from the edge pixels, among the dots of a plurality of sizes to the edge adjacent pixels. According to the printing control apparatus of Application Example 5, the dot allocation is performed on the edge adjacent pixels so that the dots having the sizes that are determined according to the distances from the edge pixels among the dots having a plurality of sizes are formed. Therefore, the dots having almost uniform size can be formed at the edge adjacent pixels so as to be aligned. Accordingly, the blurring or voids in the edge area constructed with the edge pixels and the edge adjacent pixels can be suppressed, so that the printing quality can be improved.

Application Example 6

In the printing control apparatus of Application Example 5, the dot allocation unit allocates dots to pixels excluding the edge pixels and the edge adjacent pixels among the plurality of pixels constituting the intermediate image by using a halftone process. According to the printing control apparatus of Application Example 6, the dot formed states of the normal pixels that do not correspond to the edge pixels or the edge adjacent pixels are determined by the halftone process. Therefore, with respect to the normal pixels, a total amount of ink per unit area of the printing medium can be limited. Accordingly, the occurrence of the color bleeding can be suppressed, so that the printing quality can be improved.

In the invention, the various aforementioned aspects may be adapted suitably by combining or omitting some portions thereof. For example, a printing apparatus assembled with the printing control apparatus, a printing control method, a computer program executing the methods or functions of the apparatuses, a recording medium recording the computer program, or a data signal implemented in a carrier wave including the computer program may be implemented.

BRIEF DESCRIPTION OF THE DRAWINGS

The invention will be described with reference to the accompanying drawings, wherein like numbers reference like elements.

FIG. 7 is a view for explaining a correspondence between positions of objective pixels and states of an output buffer.

FIG. 8 is a view for explaining a correspondence between positions of objective pixels and states of an output buffer.

FIG. 17 is a view for explaining a correspondence between positions of objective pixels, to which an equal-width line corresponding process is applied, and states of an output buffer.

FIG. 18 is a view for explaining a correspondence between positions of objective pixels, to which an equal-width line corresponding process is applied, and states of an output buffer.

FIG. 19 is a view for explaining a correspondence between positions of objective pixels, to which an equal-width line corresponding process is applied, and states of an output buffer.

DESCRIPTION OF EXEMPLARY EMBODIMENTS

A. Embodiment

A1. Configuration of System

Figure 1:
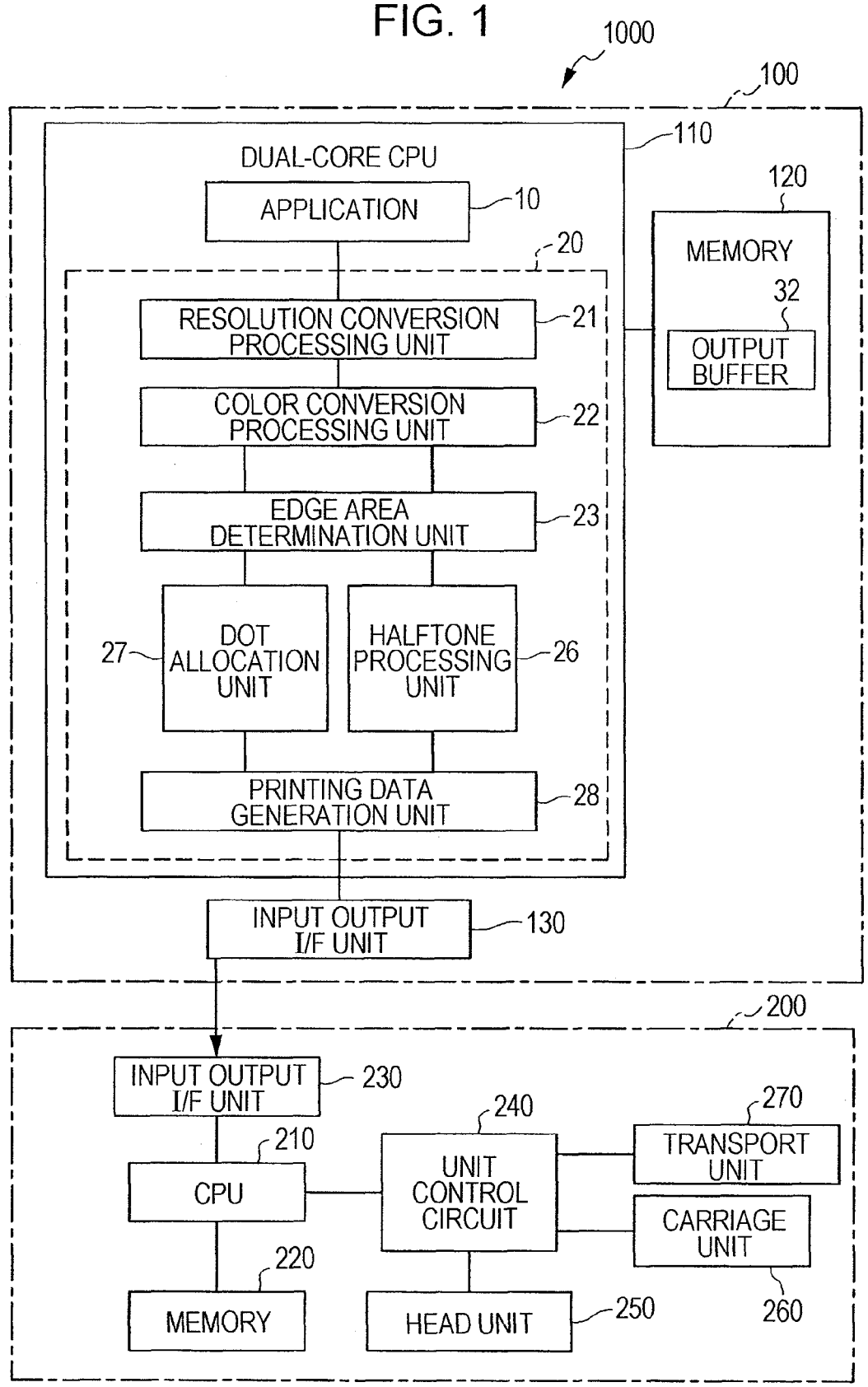
FIG. 1 is a schematic view for explaining a configuration of a printing system according to an embodiment of the invention.

FIG. 1 is a schematic view for explaining a configuration of a printing system according to an embodiment of the invention. The printing system 1000 according to the embodiment includes a personal computer 100 as an image processing apparatus and a printer 200 connected to the personal computer 100 in a wire or wireless manner.

The personal computer 100 includes a dual-core CPU 110 that executes programs to perform various processes or control operations, a memory 120 that stores programs or data information, and an input/output interface (I/F) unit 130 that performs data or information communication with peripheral apparatuses externally connected. The memory 120 includes an output buffer 32. The personal computer 100 may further include an input apparatus such as a keyboard and a pointing device, a display apparatus such as a display, and a recording reproducing apparatus such as a CD-ROM drive apparatus.

In the personal computer 100, programs such as an application program 10 and a printer driver 20 are installed. The application program 10 or the printer driver 20 is executed by the dual-core CPU 110 under a predetermined operating system (not shown).

The application program 10 is a program that implements, for example, an image editing function. A user can issue a command of printing an image that is edited by the application program 10 through a user interface provided by the application program 10. If the application program 10 receives the command of printing from the user, the application program 10 outputs the to-be-printed image to the printer driver 20. In addition, in the embodiment, the image is output as RGB data.

The printer driver 20 is a program that implements a function of generating an intermediate image based on the image output from the application program 10. The printer driver 20 is distributed in a manner where the printer driver 20 is stored in various storage media (computer-readable recording medium or the like) such as a CD-ROM. In addition, the printer driver 20 may be delivered through various communication systems such as the Internet.

The printer driver 20 receives the image from the application program 10 to generate the printing data based on the image and outputs the generated printing data to the printer 200. Herein, the printing data are data having a format that can be analyzed by the printer 200 and include various command data and dot data. The command data are data that are used to command the printer 200 to perform specific operations. The dot data are data representing dot formed states of the pixels (printing pixels) constituting the to-be-printed image (printing image). More specifically, the dot data are data representing which color and size the dot formed in each printing pixel has or whether or not the dot is formed. Herein, the "dot" denotes an ink droplet of the ink ejected from the printer 200, which is landed on the print medium. In addition, the printer 200 used in the embodiment is a printer that performs printing based on data expressed by the CMYK colorimetric system. The CMYK colorimetric system is a colorimetric system, in which an image is represented by four color components of cyan (C), magenta (M), yellow (Y), and black (K). The printer 200 performs printing by using C, M, Y, and K color inks.

The printer driver 20 includes a resolution conversion processing unit 21, a color conversion processing unit 22, an edge area determination unit 23, a halftone processing unit 26, a dot allocation unit 27, and a printing data generation unit 28. The color conversion processing unit 22 corresponds to the "color conversion unit" in the Claims; the edge area determination unit 23 corresponds to the "detection unit" in the Claims; and the dot allocation unit 27 corresponds to the "dot allocation unit" in the Claims.

The resolution conversion processing unit 21 performs a resolution conversion process for converting a resolution of the image output from the application program 10 to a printing resolution of the printer 200.

The color conversion processing unit 22 performs a color conversion process of converting the to-be-printed image represented by the RGB colorimetric system to the intermediate image that is the data represented by the CMYK colorimetric system, which can be printed by the printing apparatus. More specifically, the color conversion processing unit 22 converts the pixel values represented by the RGB values for the entire pixels constituting the image to the CMYK values. In addition, in the first embodiment, the phrase "to convert the image represented by the RGB colorimetric system to the intermediate image represented by the CMYK colorimetric system" denotes "to convert the pixel values of the image represented by the RGB values to the CMYK values, so that the converted CMYK values are divided and stored for each color component to generate the intermediate image". The CMYK value is a value representing the concentrations of the colors C, M, Y, and K as percentages. In the first embodiment, the color conversion processing unit 22 generates the intermediate image for each of the four color components.

The edge area determination unit 23 determines whether or not each pixel (hereinafter, in the first embodiment, referred to as an intermediate pixel) constituting each intermediate pixel represented by each color component of the CMYK colorimetric system is an edge area pixel. The term "edge" denotes a boundary between a bright portion and a dark portion that occur in an image, that is, a boundary between the portions, of which any of the CMYK values sharply varies. For example, the boundary between the portions, of which any of the CMYK values varies from 0% to 100%, corresponds to the edge. In the specification, the maximum concentration is 100%, and the minimum concentration is 0%. The intermediate pixel which is adjacent to the side having higher CMYK values than the edge and which has the maximum concentration is referred to as an "edge pixel". The intermediate pixel which has the maximum concentration and of which distance from the edge is 2 is referred to as an "edge adjacent pixel". In the embodiment, the width of the one intermediate pixel is denoted by the distance of 1, and the phrase "adjacent" denotes the distance of 1. In addition, the edge adjacent pixel may be set to the area having the width of a plurality (two or more) of intermediate pixels instead of the area of one pixel width. The logic AND between the edge pixel and the edge adjacent pixel is referred as an "edge area pixel" in the specification.

In other words, the edge area determination unit 23 determines whether the intermediate pixel is the edge pixel or the edge adjacent pixel. The "edge pixel" is the intermediate pixel, of which at least one of the four adjacent intermediate pixels adjacent to the intermediate pixel in the up, down, left, and right directions has the minimum concentration. The "edge adjacent pixel" is the intermediate pixel, of which at least one of the four intermediate pixels in the distance of 2 from the intermediate pixel in the up, down, left, and right direction has the minimum concentration.

The halftone processing unit 26 performs the halftone process on the intermediate pixels other than the edge area pixels based on the pixel values to determine the dot formed states of the printing pixels corresponding to the normally processed pixels and records the dot formed states in the output buffer 32. In the embodiment, the halftone processing unit 26 limits a total amount of ink per unit area of the printing medium and performs the halftone process through a threshold value process according to a dither matrix. In addition, the printer 200 used in the embodiment is a printer that can form three types of dots, that is, a small dot (hereinafter, referred to as an "S dot") having a small size, a medium dot (hereinafter, referred to as an "M dot") having a medium size, and a large dot (hereinafter, referred to as an "L dot") having a large size. Therefore, as the dot formed states of the printing pixel, there are total four options for each ink color, that is, the no-dot state, the S-dot formed state, the M-dot formed state, and the L-dot formed state.

The dot allocation unit 27 determines the dot formed state of the edge pixel among the intermediate pixels by allocating the S dot to the edge pixel and records the dot formed state in the output buffer 32. In addition, the dot allocation unit 27 determines the dot formed state of the edge adjacent pixel among the intermediate pixels by allocating the M dot to the edge adjacent pixel and records the dot formed state in the output buffer 32. In other words, the dot allocation unit 27 performs the dot formed state determination by allocating the S dot to the intermediate pixel having the maximum concentration and the distance of 1 from the edge of the image and by allocating the M dot to the intermediate pixel having the maximum concentration and the distance of 2 from the edge.

The printing data generation unit 28 generates the printing data including the dot data representing the dot formed states of the pixels constituting the to-be-printed image based on the dot formed states of the printing pixels recorded in the output buffer 32 and aligns the printing data according to the sequence of transmission to the printer 200.

The printer 200 of the embodiment is an ink jet printer that form ink dots on a printing medium to print an image. The printer 200 includes a CPU 210 that executes programs to control the entire printer 200 or to perform various processes, a memory 220 that stores programs and data information, an input/output interface (I/F) unit 230 that performs data or information communication with a personal computer 100 externally connected, a unit control circuit 240 that controls each unit according to commands from the CPU 210, a head unit 250, a carriage unit 260, and a transport unit 270.

The head unit 250 has a head (not shown) for ejecting ink on the printing medium. The head has a plurality of nozzles. The ink is intermittently ejected from each nozzle. Since the head is mounted on a carriage (not shown), if the carriage is moved in a predetermined scan direction (main scan direction), the head also moves in the main scan direction. During the movement of the head in the main scan direction, the ink is intermittently ejected, so that a dot line (raster line) in the main scan direction is formed on the printing medium. The main scan direction corresponds to the "predetermined direction" in the Claims.

The carriage unit 260 is a driving apparatus for reciprocally moving the carriage, on which the head is mounted, in the main scan direction. In addition to the head, an ink cartridge containing ink is detachably supported in the carriage.

The transport unit 270 is a driving apparatus for transporting the printing medium to a printing position and performing a sub scanning by transporting the printing medium by a predetermined transport amount in a predetermined transport direction at the time of printing. The transport unit 270 includes, for example, a feed roller, a transport motor, a transport roller, a platen, and a discharge roller (not shown). The transport direction corresponds to the "direction intersecting the predetermined direction" in the Claims.

When the printer 200 receives the printing data from the personal computer 100, the printer 200 performs the printing process. Firstly, the CPU 210 receives the printing data from the personal computer 100 through the input output interface unit 230 and positions a to-be-printed sheet (printing medium) at a print start position based on various commands included in the received printing data. The CPU 210 controls the carriage unit 260 and the head unit 250 to intermittently eject ink from the head moving in the main scan direction, so that dots are formed on the sheet by landing the ejected ink droplet on the sheet. In addition, the CPU 210 controls the transport unit 270 to transport the sheet in the transport direction, so that the sheet is moved relatively with respect to the head. Therefore, the head can form dot at a position different from the position of the previously-formed dot. In this manner, by the time that all the to-be-printed data are consumed, the dot forming process, the transport process, and the like are repeated, so that the image constructed with the dots are printed on the sheet. After that, if all the to-be-printed data are consumed, the printing process is completed.

A2. Dot Formed State Determination Process

A2-1. Whole Configuration of Determination Process

Figure 2:
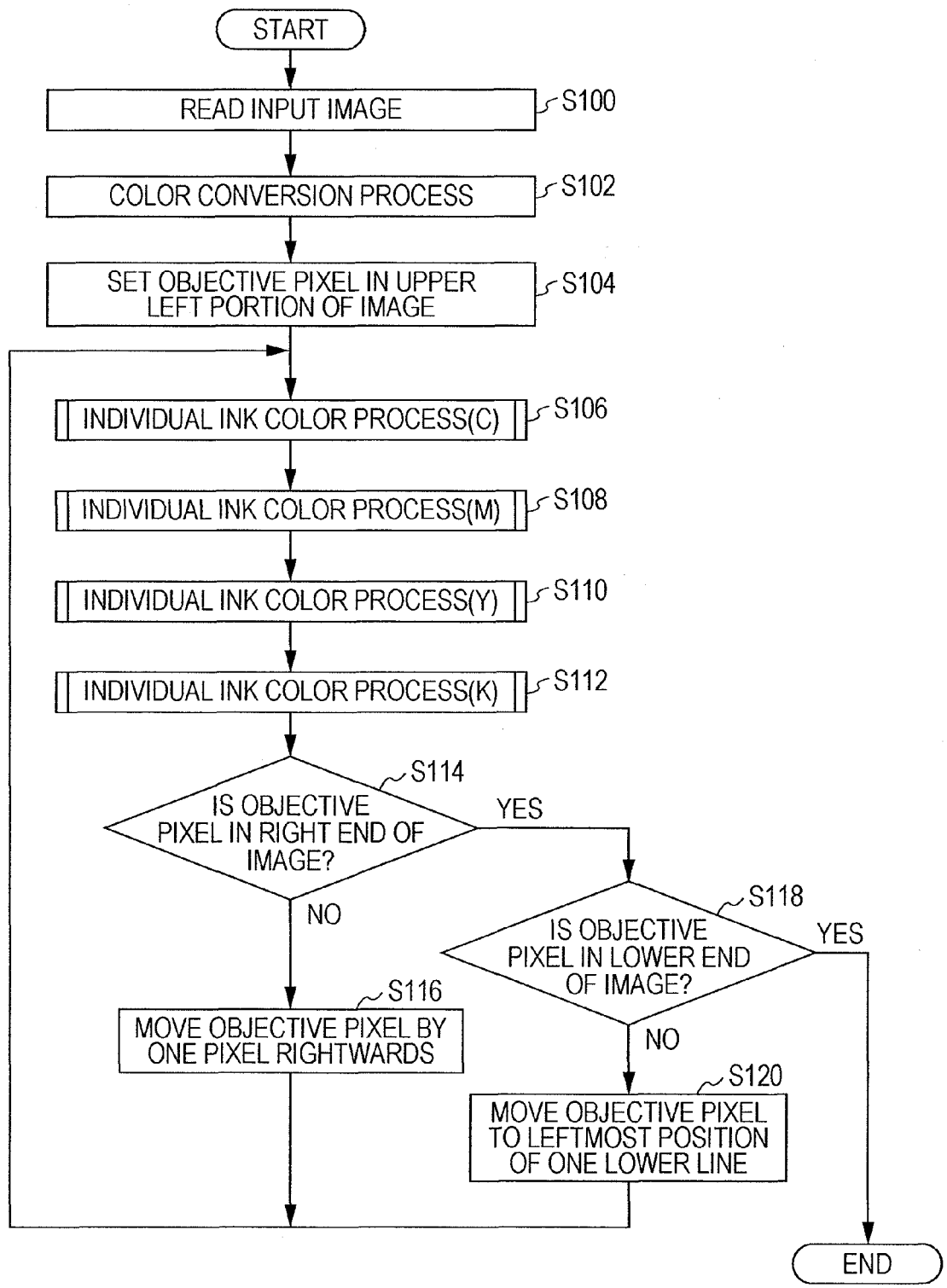
FIG. 2 is a flowchart showing a flow of a dot formed state determination process according to a first embodiment.
Figure 3:
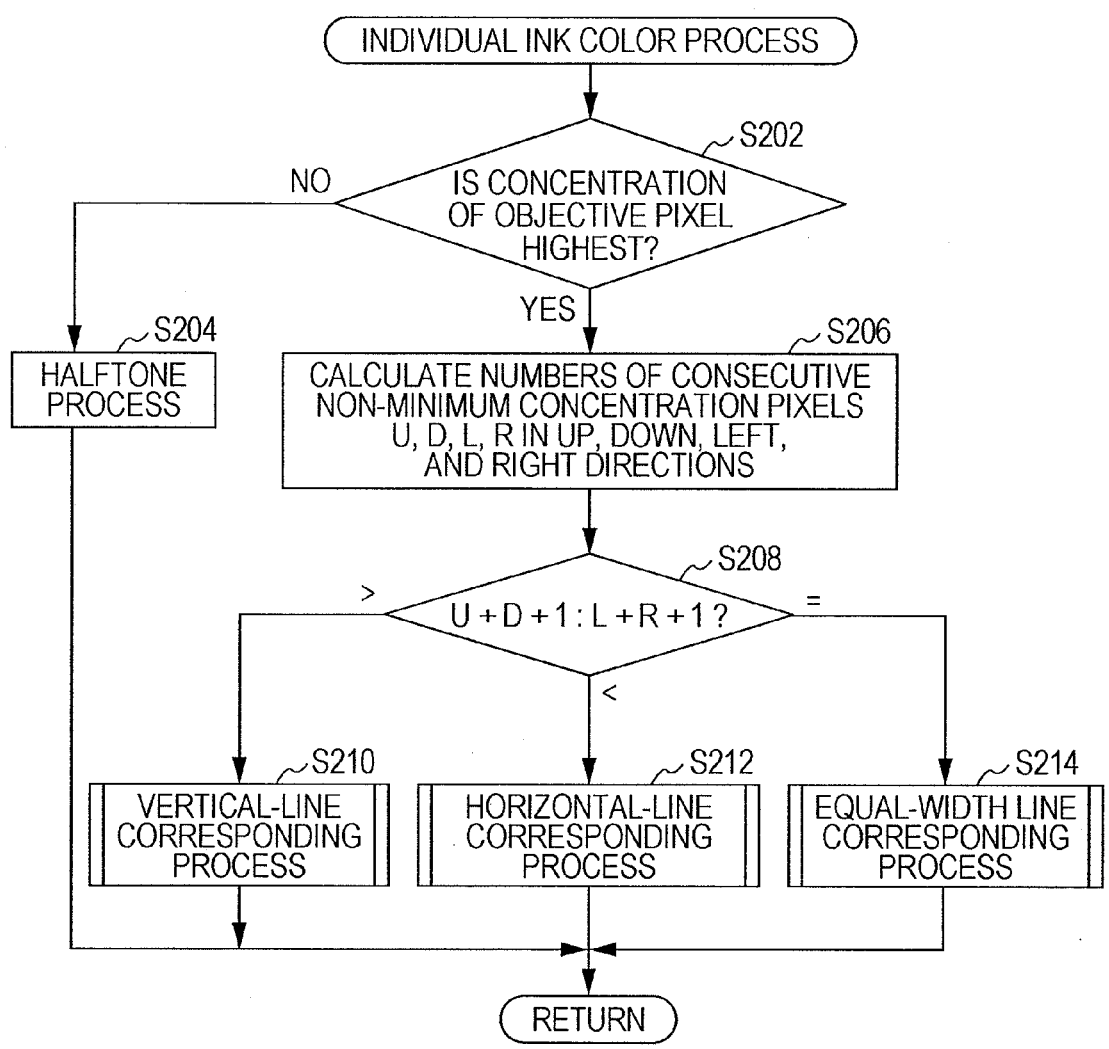
FIG. 3 is a flowchart showing a flow of an individual ink color process according to the first embodiment.

FIGS. 2 and 3 are flowcharts showing a flow of a dot formed state determination process. The dot formed state determination process is a process of determining dot formed states of printing pixels based on the image that is resolution-converted by the resolution conversion processing unit 21 and recording the dot formed states in the output buffer 32. The dot formed state determination process is performed in a process sharing manner by two processor cores that constitute the dual-core CPU (hereinafter, simply referred to as a "CPU") 110.

As shown in FIG. 2, if the process starts, the CPU 110 reads the image that is resolution-converted by the resolution conversion processing unit 21 (Step S100). Next, the CPU 110 performs a color conversion process on the read image to generate an intermediate image (Step S102).

Figure 4:
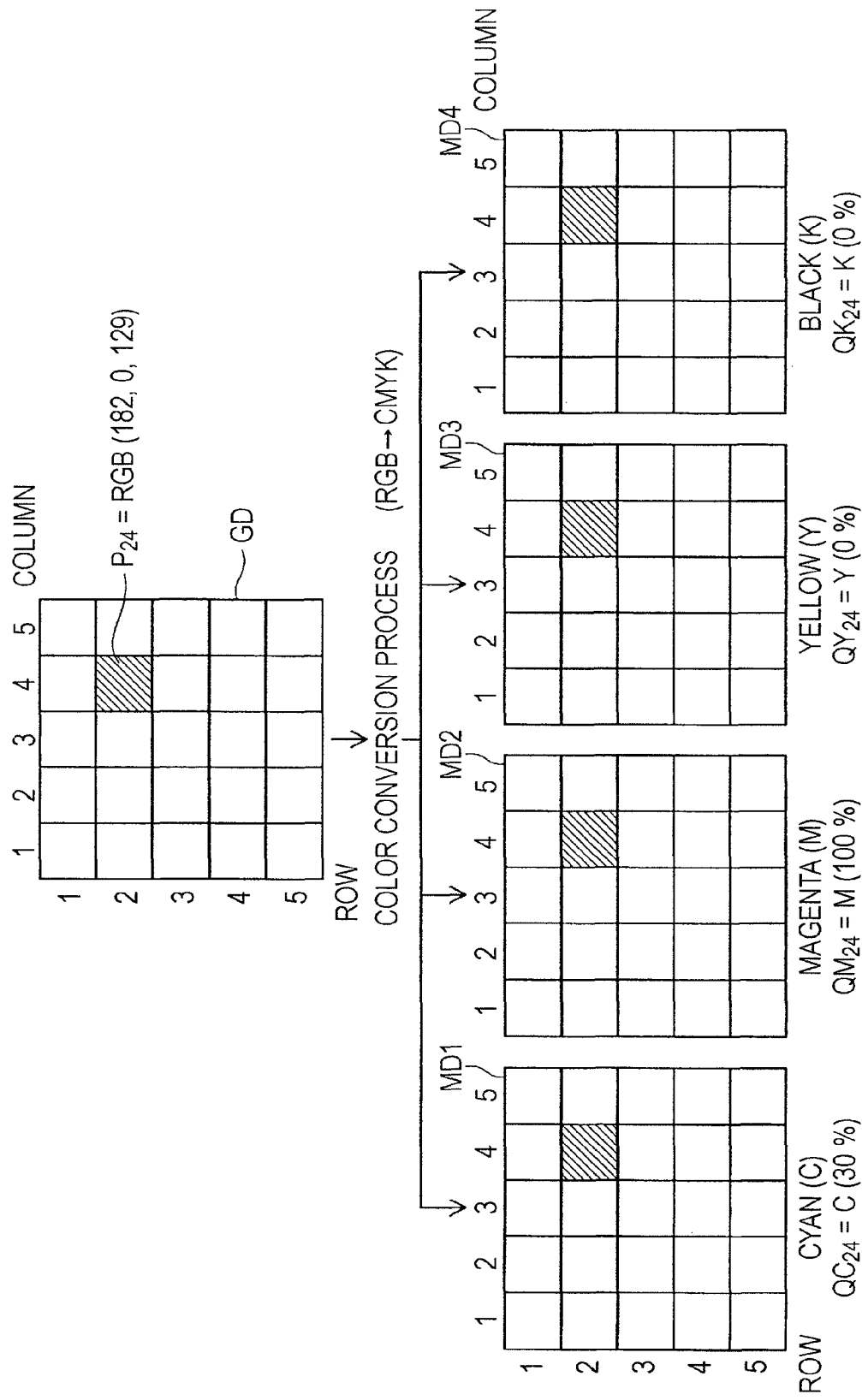
FIG. 4 is a diagrammatic view for explaining a color conversion process according to the first embodiment.

FIG. 4 is a diagrammatic view for explaining a color conversion process according to the first embodiment. In FIG. 4, for simple and easy description, an original image GD expressed in the RGB colorimetric system is shown, and the image is constructed with 5 rows and 5 columns of pixels (total 25 pixels). The process of converting the image to the intermediate image is described. In addition, in FIG. 4, each pixel of the image GD is denoted by $P_{ij}$, and each intermediate pixel constituting the intermediate image MD is denoted by $Q_{ij}$. Herein, i denotes a row number, and j denotes a column number. For example, in the image GD, the hatched pixel (pixel located at the second row and fourth column) is denoted by $P_{24}$. In addition, R, G, B gradation values of each pixel in the image GD are expressed by RGB (R gradation value, G gradation value, B gradation value). For example, $P_{24}$=RGB (182, 0, 129).

If the color conversion process is performed on the image GD, the RGB value of each pixel of the image GD is converted to a CMYK value. If the CMYK value is expressed by CMYK (C value, M value, Y value, K value), the pixel $P_{24}$=RGB (182, 0, 129) is color-converted to the intermediate pixel $Q_{24}$=CMYK (30, 100, 0, 0). Herein, each value of CMYK denotes the concentration of each color component. For example, in the case where the pixel $P_{24}$ is expressed by the CMYK colorimetric system, the pixel can be expressed by mixing cyan having a concentration of 30% and magenta having a concentration of 100%. In addition, in FIG. 4, the value of cyan is expressed by $QC_{ij}$; the value of magenta is expressed by $QM_{ij}$; the value of yellow is expressed by $QY_{ij}$; and the value of black is expressed by $QB_{ij}$.

The color conversion processing unit 22 generates intermediate images MD1 to MD4 for C, M, Y, K color components. In FIG. 4, the intermediate image MD1 is an image that is generated by extracting only the value of cyan (C) from the entire intermediate pixel. The intermediate image MD2 is an image that is generated by extracting only the value of magenta (M) from the entire intermediate pixel. The intermediate image MD3 is an image that is generated by extracting only the value of yellow (Y) from the entire intermediate pixel. The intermediate image MD4 is an image that is generated by extracting only the value of black (K) from the entire intermediate pixel. In the first embodiment, the predetermined maximum concentration of each color component is 100%, and the predetermined minimum concentration is 0%. Alternatively, the maximum and minimum concentrations of each color component may be set to arbitrary values, for example, 98% (maximum concentration) and 5% (minimum concentration).

Figure 5:
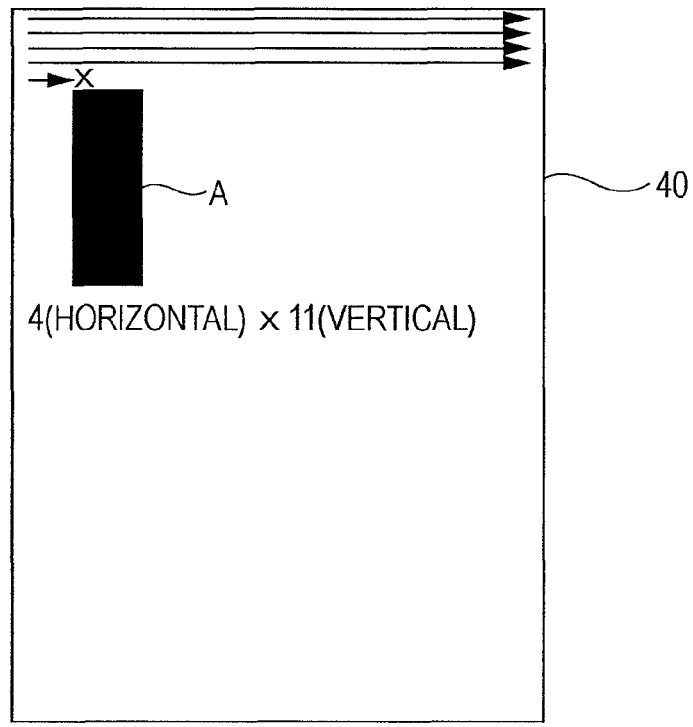
FIG. 5 is a view for explaining an example of a color-converted to-be-printed image.

If the color conversion process is ended, the CPU 110 sets the intermediate pixel of the upper left position in the intermediate image 40 shown in FIG. 5 as an initial objective pixel (Step S104). Next, the CPU 110 performs individual ink color processes on the entire color components (Steps S106 to S112). The individual ink color process (C) is a process that determines the dot formed state for cyan. The individual ink color process (M) is a process that determines the dot formed state for magenta. The individual ink color process (Y) is a process that determines the dot formed state for yellow. The individual ink color process (K) is a process that determines the dot formed state for black.

The individual ink color processes are described with reference to FIGS. 3 and 5. Hereinafter, as an example, the individual ink color process for cyan is described.

FIG. 5 is a view for explaining an example of a color-converted to-be-printed image. The intermediate image 40 is an image that is expressed based on the cyan intermediate image MD1. In addition, the intermediate image MD1 shown in FIG. 5 is different from the intermediate image MD1 that is described with reference to FIG. 4. Hereinafter, the printing process that is performed based on the intermediate image 40 is described. The intermediate image 40 shown in FIG. 5 has a line drawing A. The line drawing A is constructed with cyan-color intermediate pixels in 4 (horizontal-line)×11 (vertical-line). All the intermediate pixels in the portion excluding the line drawing A of the intermediate image 40 are white-color pixels. In other words, the intermediate image 40 is a mono image (single color image) constructed with a white color and a cyan color that is one of the ink dot colors. In addition, in FIG. 5, the mark x denotes an objective pixel described later, and a solid line arrow denotes a trajectory along which the objective pixel is moved.

Figure 6:
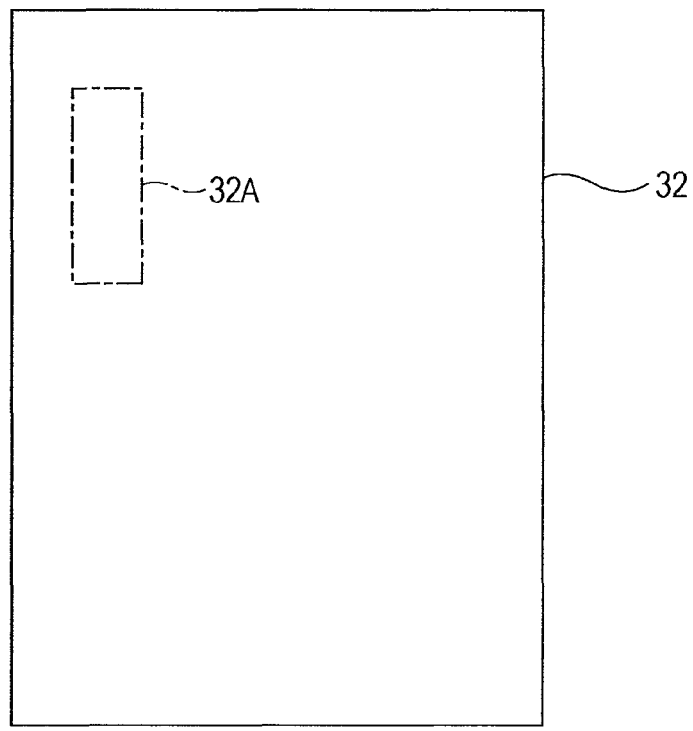
FIG. 6 is a view for explaining a configuration of an output buffer shown in FIG. 1.

FIG. 6 is a view for explaining a configuration of the output buffer 32 shown in FIG. 1. The output buffer 32 is configured so that the dot formed states of the printing pixels corresponding to the pixels of the intermediate image 40 can be recorded. The portion 32A shown in FIG. 6 is a portion corresponding to the line drawing A of the intermediate image 40. In addition, the output buffer 32 is not necessarily configured to have such a capacity that the dot formed states of the printing pixels corresponding to the intermediate pixels in the entire intermediate image 40 can be recorded. In the case where the printing process is performed in units of band (divided image obtained by dividing the intermediate image 40 into a plurality of band-shaped areas), the output buffer 32 may be configured to have such as capacity that the dot formed states of the printing pixels corresponding to the pixels in the band can be recorded.

FIGS. 7 and 8 are views for explaining a correspondence between the positions of objective pixels and the states of the output buffer 32. The upper portions of FIGS. 7 and 8 show positions (denoted by the mark x) of the objective pixel in the relation to the line drawing A (FIG. 5) on the intermediate image 40, and the lower portions show states of the portion 32A (FIG. 6) corresponding to the line drawing A in the output buffer 32. In the figure, the symbol "S" denotes the dot formed state, in which "the S dot is formed"; the symbol "M" denotes the dot formed state, in which "the M dot is formed"; and the symbol "L" denotes the dot formed state, in which "the L dot is formed". As time elapses, the states are transitioned from the left end state (state 1*a*) to the right end state (state 1*e*) in FIG. 7, and the states are transitioned from the left end state (state 1 0 to the right end state (state 1*j*) in FIG. 8. The state 1*a* shown in FIG. 7 is the state when the upper left pixel of the intermediate image 40 is set as an initial objective pixel. In addition, in the embodiment, all the pixels constituting the line drawing A are the pixel having the maximum concentration.

If the individual ink color process starts, the CPU 110 determines whether or not the objective pixel is the pixel having the maximum concentration (Step S202). Since the intermediate image 40 used in the embodiment is in white in all the portions excluding the line drawing A, the CPU 110 determines with respect to the state 1*a* of FIG. 7 whether or not the objective pixel has the maximum concentration. In the case where the cyan concentration of the objective pixel is determined not to be the maximum concentration (Step S202: NO), the CPU 110 performs the halftone process on the pixel by the halftone processing unit 26. Next, the individual ink color processes for magenta, yellow, and black are ended, and the process proceeds to the Step S114 of FIG. 2 (Step S204). As a result of the halftone process, in the state 1*a* of FIG. 7, the dot formed state of the printing pixel corresponding to the objective pixel is determined to be the state, in which "no dot is formed".

After the Step S204 is performed, the CPU 110 determines in Step S114 (FIG. 2) whether or not the objective pixel is the right end pixel of the intermediate image 40. For example, in the case where the positions of the pixels are represented by coordinates, it may be determined based on the size of the image and the coordinates whether or not the pixel is located at the right end. In the case where the objective pixel is not the right end pixel of the intermediate image 40 (Step S114: NO), the CPU 110 sets the pixel at the right by one pixel as the objective pixel (Step S116). After that, the process returns to Step S106.

If the dot formed state of the printing pixel corresponding to the objective pixel is determined in the state 1*a* of FIG. 7, the pixel at the right by one pixel is set as the objective pixel. Next, in Step S202, it is determined again whether or not the objective pixel is the maximum concentration pixel. Therefore, in the state, the halftone process is also performed by the halftone processing unit 26 in Step S204, and the dot formed state of the printing pixel corresponding to the objective pixel is determined to be the state, in which "no dot is formed". In other words, in the first embodiment, with respect to all the pixels excluding the maximum concentration pixels, the dot formed states thereof are determined by the halftone process. If the objective pixel is moved from the state 1*a* of FIG. 7 to the right end of intermediate image 40 by the repetition of the process, the objective pixel is determined to be at the right end in Step S114. At this time, the CPU 110 determines whether or not the objective pixel is the lower end pixel of the image (Step S118). In the case where the objective pixel is not the lower end pixel of the image (Step S118: NO), the CPU 110 allows the objective pixel to move at the left end of one lower line of the image (Step S120). After that, the process returns to Step S106.

If the objective pixel is moved to the position represented by the state 1*b* of FIG. 7 due to the repetition of the aforementioned process, the CPU 110 determines again in Step S202 whether or not the objective pixel is the maximum concentration pixel. Since the objective pixel in the state 1*b* is the maximum concentration pixel, the CPU 110 performs the processes of Steps S206 to S214 to determine the dot formed state of the printing pixel corresponding to the objective pixel included in a grouped area of non-minimum concentration pixels. In addition, in the first embodiment, in the case where the concentration of the objective pixel is not the maximum concentration, the dot formed state is determined by the halftone process irrespective of the position of the objective pixel. For example, in the state 1*b*, in the case where the objective pixel is located at the edge portion with respect to the white pixel but the objective pixel is not the maximum concentration pixel, the dot formed state of the objective pixel is determined by the halftone process. Similarly, in the hereinafter states, the dot formed states of the pixels that are not the maximum concentration pixels are determined by the halftone process irrespective of the positions thereof.

The processes of Steps S206 to S214 include the process of the dot allocation unit 27 (FIG. 1). Now, the process of the dot allocation unit 27 is described in detail. In the embodiment, the process of the dot allocation unit 27 obtains the size of the vertical direction (up-and-down direction) of the line drawing and the size of the horizontal direction (left-and-right direction) and determines which of the sizes is narrower. The process generates a dot pattern corresponding to the distance of the objective pixel from the edge in the narrower direction (hereinafter, referred to as a "narrow direction"). Herein, the "dot pattern" is a line having a dot size corresponding to each printing pixel.

Figures 9A, 9B, 9C, 9D, 10:
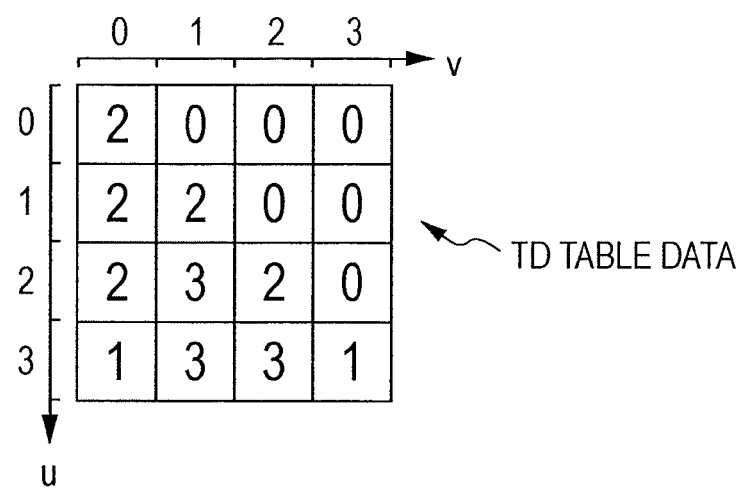
FIGS. 9A to 9D are views for explaining examples of dot patterns that are generated by a dot allocation unit.
FIG. 10 is a view for explaining table data TD that is used to generate four types of dot patterns.

FIGS. 9A to 9D are views for explaining examples of dot patterns that are generated by a dot allocation unit 27. The dot pattern varies according to the number of pixels of the line drawing in the narrow direction, that is, the line width. FIG. 9A shows a dot pattern in which the line width is one pixel. FIG. 9B shows a dot pattern in which the line width is two pixels. FIG. 9C shows a dot pattern in which the line width is three pixels. FIG. 9D shows a dot pattern in which the line width is four pixels. As shown in FIG. 9A, the dot pattern in which the line width is one pixel is "M". As shown in FIG. 9B, the dot pattern in which the line width is two pixels is "MM". As shown in FIG. 9C, the dot pattern in which the line width is three pixels is "MLM". As shown in FIG. 9D, the dot pattern in which the line width is four pixels is "SLLS".

FIG. 10 is a view for explaining table data TD that is used to generate the four types of dot patterns. As shown in the figure, the table data TD is a 4×4 matrix in which 0 to 3 in the vertical direction (u direction) and 0 to 3 in the horizontal direction (v direction). As the numerical values recorded in the table data TD, "1" denotes an "S" dot; "2" denotes an "M" dot; and "3" denotes an "L" dot. In addition, "0" denotes that no dot is generated.

The dot allocation unit 27 can obtain dot patterns shown in FIGS. 9A to 9D by reading data of recording positions according to factors u and v from the table data TD. As a result, when (u, v)=(0, 0), the dot pattern "M" shown in FIG. 9A can be obtained. When (u, v)=(1, 0), (1, 1), the dot pattern "MM" shown in FIG. 9B can be obtained. When (u, v)=(2, 0), (2, 1), (2, 2), the dot pattern "MLM" shown in FIG. 9C can be obtained. When (u, v)=(3, 0), (3, 1), (3, 2), (3, 3), the dot pattern "SLLS" shown in FIG. 9D can be obtained. In addition, each dot pattern is determined so that the size thereof is increased as the distance from the edge is increased.

Hereinafter, returning to FIG. 3, processes of Step S206 to S214 are described in detail. If the objective pixel has a maximum concentration, the process proceeds to Step S206. Firstly, with respect to the intermediate pixel, the CPU 110 calculates the consecutive numbers (hereinafter, in the embodiment, referred to as a consecutive number of non-minimum concentration pixels) U, D, L, and R of the cyan-color pixels that are in the up, down, left, and right directions of the objective pixel and are not the pixels having the minimum concentration (0%) (Step S206). The "U" is a consecutive number of the cyan color pixels in the up direction of the objective pixel. The "D" is a consecutive number of the cyan color pixels in the down direction of the objective pixel. The "L" is a consecutive number of the cyan color pixels in the left direction of the objective pixel. The "R" is a consecutive number of the cyan color pixels in the right direction of the objective pixel.

In addition, in the embodiment, since the line width of the dot allocated by the dot allocation unit 27 is up to four pixels, if the line width is 5 pixels or more, the accurate line width is not necessarily known. Therefore, calculation of the values of the consecutive numbers U, D, L, and R of the non-minimum concentration pixels is configured to stop at the time when the line width is counted up to the maximum value of 4. In other words, in the case where a real line width exceeds 4, the values of the consecutive numbers U, D, L, and R of the non-minimum concentration pixels are the value of 4.

Next, the CPU 110 compares the value of U+D+1 with the value of L+R+1 to determine inequality (including equality) of the two values (Step S208). The value of U+D+1 denotes the number of pixels of the line drawing including the objective pixel in the vertical direction, and the value of L+R+1 denotes the number of pixels of the line drawing including the objective pixel in the horizontal direction. Therefore, according to the process of Step S208, it is determined which of the vertical line where the number of pixels in the horizontal direction is smaller than the number of pixels in the vertical direction, the horizontal line where the number of pixels in the vertical direction is smaller than the number of pixels in the horizontal direction, and the equal-width line where the number of pixels in the vertical direction is equal to the number of pixels in the horizontal direction the line drawing including the objective pixel is included.

In the case of ">" in Step S208, that is, in the case where the line drawing including the objective pixel is determined to be the vertical line, the CPU 110 performs the dot forming process corresponding to the vertical line, that is, the vertical line corresponding process (Step S210). In addition, in the case of "<" in Step S208, that is, in the case where the line drawing including the objective pixel is determined to be the horizontal line, the CPU 110 performs the dot forming process corresponding to the horizontal line, that is, the horizontal line corresponding process (Step S212). In addition, in the case of "=" in Step S208, that is, in the case where the line drawing including the objective pixel is determined to be the equal-width line, the CPU 110 performs the dot forming process corresponding to the equal-width line, that is, the equal-width line corresponding process (Step S214).

In the case where the objective pixel is located at the position represented in the state 1b of FIG. 7, since U=0, D=4, L=0, and R=3, the process proceeds to Step S210, so that the vertical line corresponding process is performed.

A2-2. Configuration of Vertical Line Corresponding Process

Figure 11:
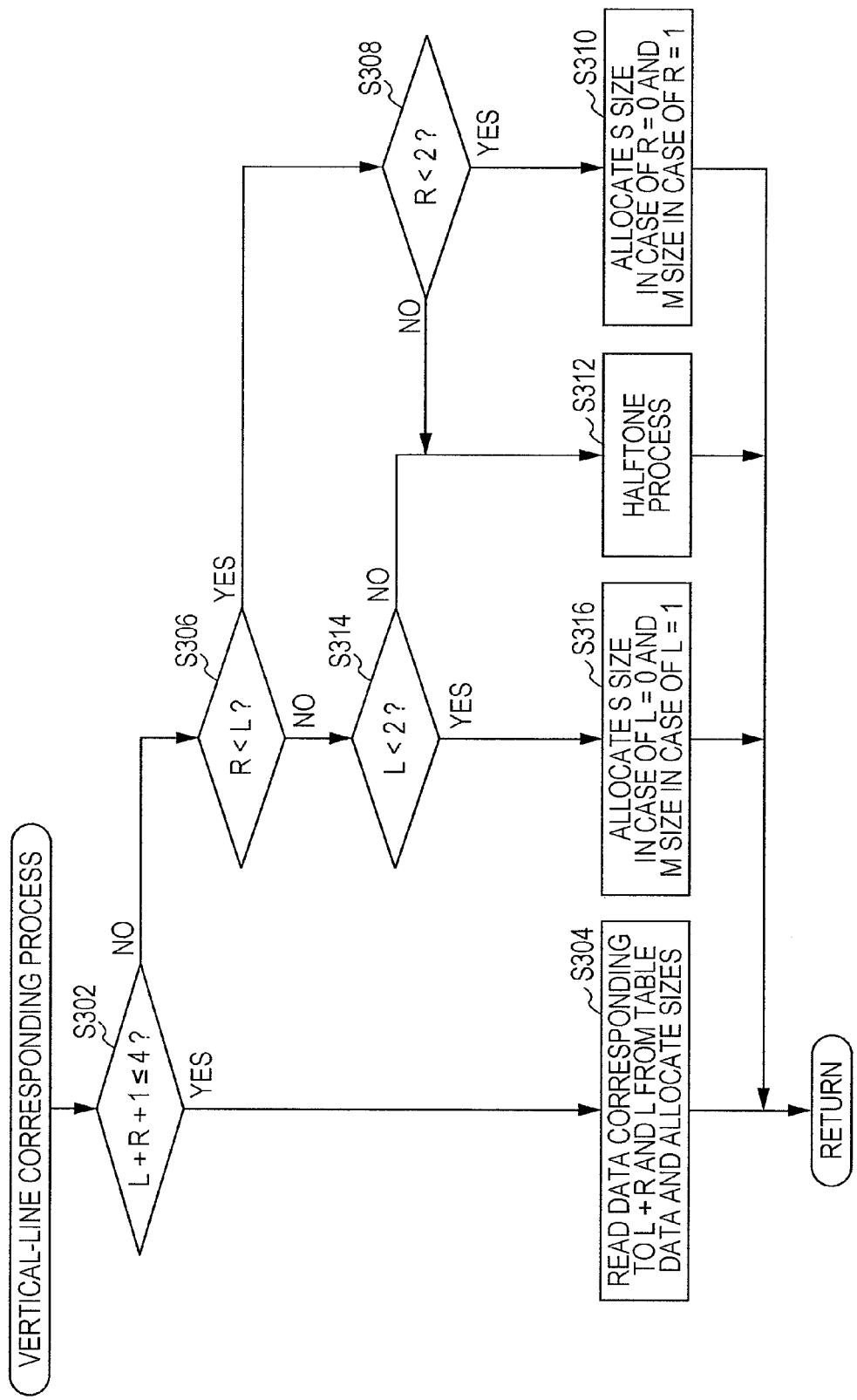
FIG. 11 is a flowchart showing a vertical line corresponding process that is performed in Step S210.

FIG. 11 is a flowchart showing the vertical line corresponding process that is performed in Step S210. Firstly, the CPU 110 determines in Step S302 whether or not the value of L+R+1, that is, the number of pixels of the line drawing in the horizontal direction is the value of 4 or less. If it is determined in Step S302 that L+R+1≤4, the CPU 110 performs of reading data of the recording position corresponding to (u, v)=(L+R, L) from the table data TD (FIG. 10) and of allocating the dots having the sizes according to the data by the dot allocation unit 27 (Step S304). In other words, the number of pixels of the line drawing in the narrow direction (horizontal direction) is set as a factor u, and the position of the pixel in the narrow direction (distance from the one side edge) is set as a factor v. The process of reading the data of the recording positions corresponding to the factors u and v from the table data TD and the process of allocating the dots having the sizes according to the data are performed. In the case where the objective pixel is located at the position represented by the state 1b of FIG. 7, since L+R-3 and L=0, the value of 1 stored in the (u, v)=(3, 0) is read from the table data TD, and the dots having the S size can be allocated.

Next, if the objective pixel is moved by one pixel from the state 1b of FIG. 7 rightwards to be in the state 1c of FIG. 7, it is determined whether or not the objective pixel is also the maximum concentration pixel. If the objective pixel is determined to be the maximum concentration pixel, the process of calculating the consecutive numbers U, D, L, and R of the non-minimum concentration pixels is performed in Step S206 (FIG. 3). In the case where U=0, L=1, R=2, and D=4 are calculated, since U+D+1>L+R+1, the vertical line corresponding process is also applied to the objective pixel. In the vertical line corresponding process (FIG. 11), since L+R+1=4, the process proceeds to Step S304. Since L+R=3 and L=1, the value of 3 stored in (u, v)=(3, 1) is read from the table data TD, so that the dots having the L sizes can be allocated.

Sequentially, if the objective pixel is moved by one pixel from the state 1c of FIG. 7 rightwards to be in the state 1d of FIG. 7, it is determined whether or not the objective pixel is also the maximum concentration pixel. If the objective pixel is determined to be the maximum concentration pixel, the process of calculating the consecutive numbers U, D, L, and R of the non-minimum concentration pixels is performed in Step S206 (FIG. 3). In the case where U=0, L=2, R=1, and D=4 are calculated, since U+D+1>L+R+1, the vertical line corresponding process is also applied to the objective pixel. In the vertical line corresponding process (FIG. 11), since L+R+1=4, the process proceeds to Step S304. Since L+R=3 and L=2, the value of 3 is read from the table data TD, so that the dots having the L sizes can be allocated.

Similarly, the objective pixel is moved rightwards, and with respect to the state 1e of FIG. 7, it is determined whether or not the objective pixel is the maximum concentration pixel. If the objective pixel is determined to be the maximum concentration pixel, the process of calculating the consecutive numbers U, D, L, and R of the non-minimum concentration pixels is performed in Step S206 (FIG. 3), so that the vertical line corresponding process is performed. In the vertical line corresponding process (FIG. 11), since L+R+1=4, the process proceeds to Step S304. Since L+R=3 and L=3, the value of 1 is read from the table data TD, and the dots having the S sizes can be allocated.

The state where the objective pixel is moved by one lower line is shown in the state if of FIG. 8. Similarly, it is determined whether or not the objective pixel is also the maximum concentration pixel. If the objective pixel is determined to be the maximum concentration pixel, the process of calculating the consecutive numbers U, D, L, and R of the non-minimum concentration pixels is performed in Step S206 (FIG. 3). Since U=1, L=0, R=3, and D=4 are calculated, U+D+1>L+R+1. Therefore, the vertical line corresponding process is also applied to the objective pixel. In the vertical line corresponding process (FIG. 11), since L+R+1=4, the process proceeds to Step S304. Since L+R+1=4 and L=0, the value of 1 is read from the table data TD, and the dots having the S sizes can be allocated.

Similarly, with respect to the objective pixels at the state 1g, the state 1h, and the state 1i (FIG. 7), since L=1, L=2, and L=3, the objective pixels are allocated with the dots having the L size, the L size, and the S size. In addition, the same process is applied to the remaining pixels, so the objective pixel at the state 1j is allocated with the dot. As a result, the dot formed states of all the pixels included in the line drawing A are determined. In addition, in the case where the objective pixel is not the maximum concentration pixel (Step S202 of FIG. 3: NO), with respect to even the pixel located in the edge portion of the image, the dot formed state may be determined by the halftone process (Step S204 of FIG. 3). Therefore, even in the edge portion, the pixel at which the dot having the M size is formed may exist.

Returning to FIG. 11, in the case where it is determined in Step S302 that the number of pixels of the line drawing in the horizontal direction exceeds the value of 4, the CPU 110 performs the processes of Steps S306 to S316. In other words, the CPU 110 firstly determines whether or not R is smaller than L (Step S306). If R is determined to be smaller than L, the CPU 110 determines whether or not R is less than the value of 2 (Step S308). If it is determined that R is smaller than L and R is less than the value of 2, the CPU 110 allocates the dot having the S size to the objective pixel corresponding to the edge pixel (in the case of R=0) and the dot having the M size to the objective pixel corresponding to the edge adjacent pixel (in the case of R=1) (Step S310). On the other hand, if it is determined in Step S308 that R is equal to or more than the value of 2, the CPU 110 performs the same halftone process as Step S204 (FIG. 3) (Step S312).

In addition, if it is determined in Step S306 that R is equal to or more than L, the CPU 110 determines whether or not L is less than the value of 2 (Step S314). If it is determined that L is less than the value of 2, the CPU 110 allocates the dot having the S size to the objective pixel corresponding to the edge pixel (in the case of L=0, and the dot having the M size to the objective pixel corresponding to the edge adjacent pixel (in the case of L=1) (Step S316). On the other hand, if it is determined in Step S314 that L is equal to or more than the value of 2, the process proceeds to Step S312, in which the same halftone process as Step S204 (FIG. 3) is performed. In other words, according to Steps S310 and S316, the dot pattern corresponding to the distance of the objective pixel from the edge in the narrow direction (line width direction) is generated. After Step S304, Step S310, Step S312, or Step S316 is performed, the process proceeds to "RETURN", and the vertical line corresponding process is once ended.

A2-3. Configuration of Horizontal Line Corresponding Process

Figure 12:
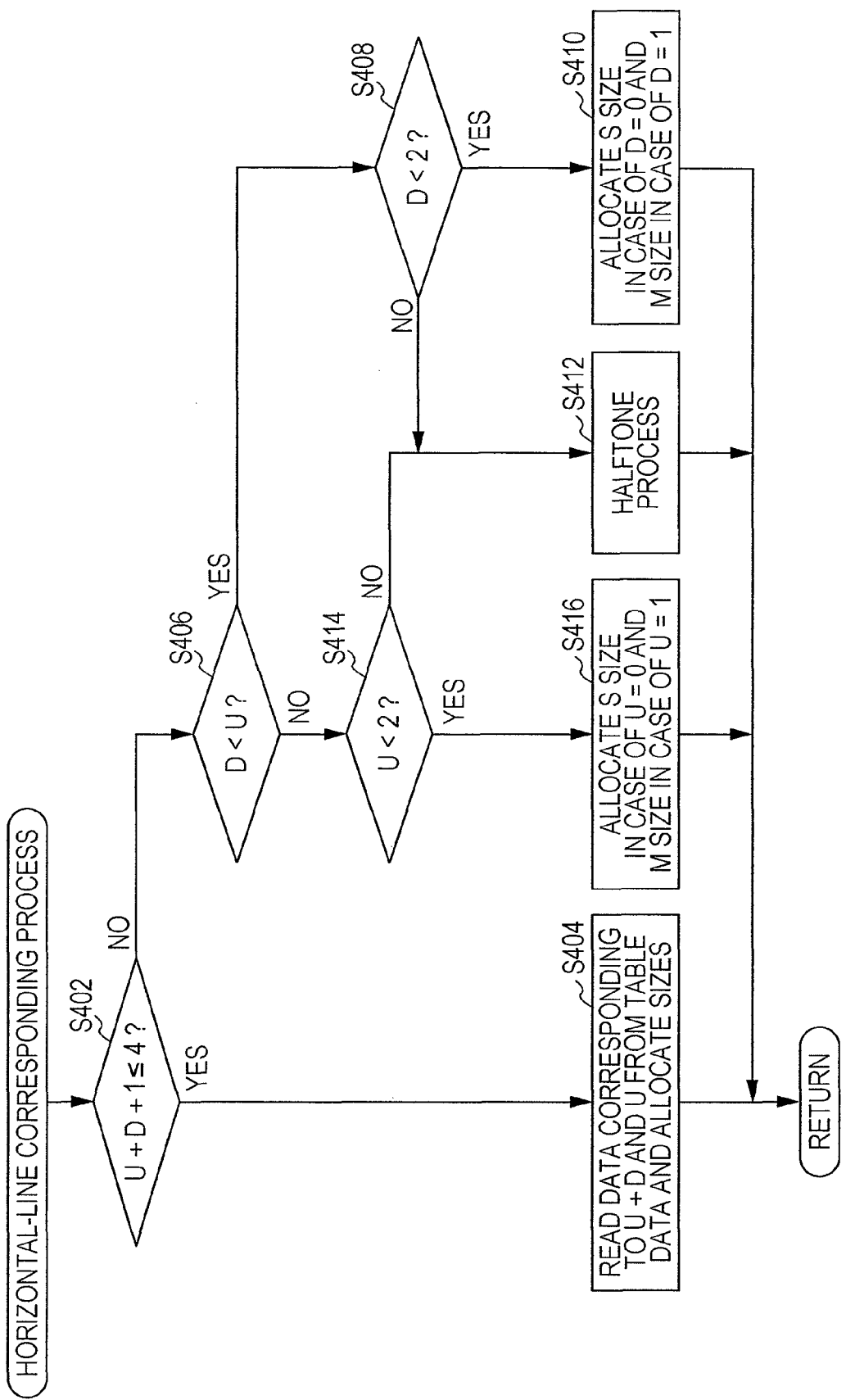
FIG. 12 is a flowchart showing a horizontal line corresponding process that is performed in Step S212.

FIG. 12 is a flowchart showing the horizontal line corresponding process that is performed in Step S212. The horizontal line corresponding process is configured according to the same principle as that of the vertical line corresponding process that is described with reference to FIG. 11. In other words, in the vertical line corresponding process, the dot pattern corresponding to the distance of the objective pixel from the edge in the narrow direction, that is, in the left-and-right direction (LR directions) is generated. In the horizontal line corresponding process, the dot pattern corresponding to the distance of the objective pixel from the edge in the narrow direction, that is, in the up-and-down direction (UD direction) is generated. As a result, as shown in the figure, the horizontal line corresponding process can be described by replacing "L" with "U" and replacing "R" with "D" in the vertical line corresponding process of FIG. 11. In addition, with respect to the reference numerals of the Steps, the first digit (that is, 3) of the reference numeral of the vertical line corresponding process is replaced with 4, and the last two digits thereof are the same as those of the vertical line corresponding process.

Figure 13:
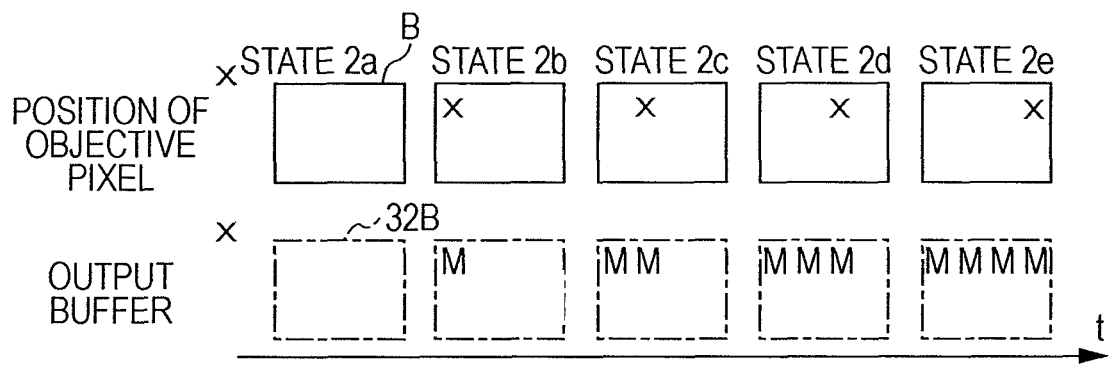
FIG. 13 is a view for explaining a correspondence between positions of objective pixels, to which a horizontal line corresponding process is applied, and states of an output buffer.
Figure 14:
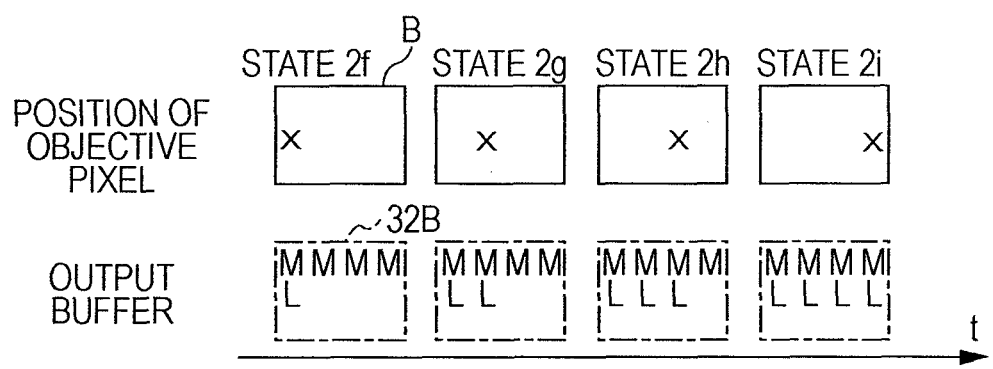
FIG. 14 is a view for explaining a correspondence between positions of objective pixels, to which a horizontal line corresponding process is applied, and states of an output buffer.
Figure 15:
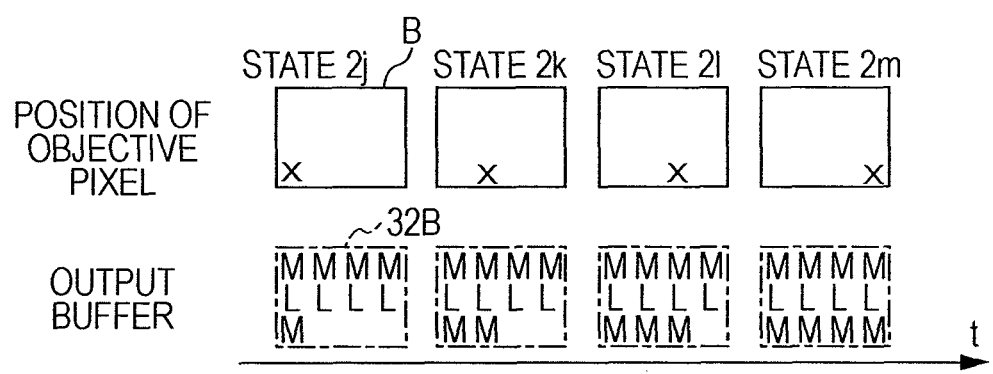
FIG. 15 is a view for explaining a correspondence between positions of objective pixels, to which a horizontal line corresponding process is applied, and states of an output buffer.

FIGS. 13 to 15 are views for explaining a correspondence between positions of the objective pixels, to which the horizontal line corresponding process is applied, and the states of the output buffer 32B. In the upper portions of FIGS. 13 to 15, the positions (denoted by the marks x) of the objective pixels in the line drawing B are shown, and in the lower portions, the states of the portions 32B of the output buffer 32B corresponding to the line drawing B are shown. The line drawing B is constructed with the cyan color pixels of 4 (horizontal)×3 (vertical) so that the horizontal line corresponding process can be applied. As time elapses, the states are transitioned from the left end state (state 2a) to the right end state (state 2e) in FIG. 13; the states are transitioned from the left end state (state 2f) to the right end state (state 2i) in FIG. 14; and the states are transitioned from the left end state (state 2j) to the right end state (state 2m) in FIG. 15.

Herein, detailed description of the steps of the horizontal line corresponding process shown in FIG. 12 and the transitions of the states 2a to 2m shown in FIGS. 13 to 15 are omitted. The important point is that, in the case of a horizontal line where the number of pixels of the line drawing in the vertical direction is 4 or less, the dot pattern corresponding to the distance of the objective pixel from the edge in the narrow direction, that is, in the vertical direction is generated. In addition, in FIGS. 13 to 15, for simplifying the later description, the entire pixels constituting the line drawing B are set to have the maximum concentration. The factor u is set to U+D, and the factor v is set to U. The dot pattern corresponding to the distance of the objective pixel from the edge in the vertical direction is generated by reading data from the table data TD shown in FIG. 10. As a result, as shown in the state 2m of FIG. 15, in the horizontal line of which the number of pixels in the vertical direction is 3, the dot having the M size is allocated to each printing pixel of the upper row; the dot having the L size is allocated to each printing pixel of the central row in the up-and-down direction; and the dot having the M size is allocated to each printing pixel of the lower row.

A2-4. Configuration of Equal-Width Line Corresponding Process

Figure 16:
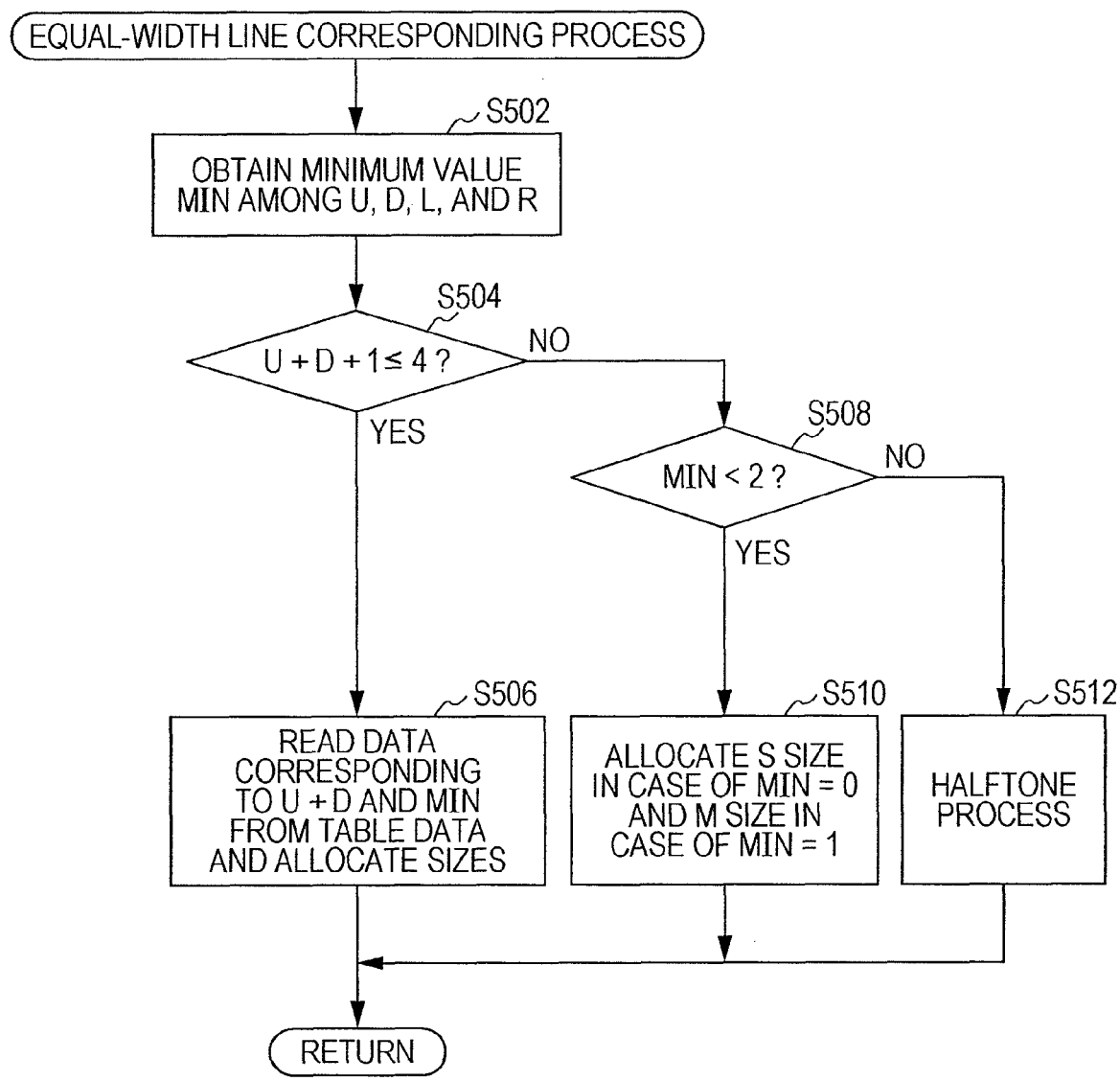
FIG. 16 is a flowchart showing an equal-width line corresponding process that is performed in Step 214.

FIG. 16 is a flowchart showing an equal-width line corresponding process that is performed in Step 214. If the process proceeds to the equal-width line corresponding process, the CPU 110 firstly acquires the shortest distance MIN of the objective pixel from the edge by selecting the minimum value among the consecutive numbers U, D, L, and R of the non-minimum concentration pixels calculated in Step S206 (Step S502).

Next, the CPU 110 determines whether or not the value of U+D+1, that is, the number of pixels having a horizontal width of the line drawing is the value 4 or less (Step S504). If it is determined in Step S504 that U+D+1≤4, the CPU 110 allows the dot allocation unit 27 to read the data of the recording position corresponding to (u, v)=(U+D, MIN) from the table data TD (FIG. 10) and to allocate the dots having the sizes according to the data (Step S506). In other words, the value of the factor v is set to the shortest distance MIN, and the data is read from the table data TD.

On the other hand, if it is determined in Step S504 that U+D+1>4, it is determined whether or not the shortest distance MIN is less than the value of 2 (Step S508). If it is determined that the shortest distance MIN is less than the value of 2, the dot having the S size is allocated to the objective pixel corresponding to the edge pixel (in the case of MIN=0), and the dot having the M size is allocated to the objective pixel corresponding to the edge adjacent pixel (in the case of MIN=1) (Step S510). On the other hand, if it is determined in Step S508 that the shortest distance MIN is equal to or more than the value of 2, the same halftone process as Step S204 (FIG. 3) is performed (Step S512). After Step S506, Step S510, or Step S512 is performed, the process proceeds to "RETURN", and the equal-width line corresponding process is once ended.

FIGS. 17 to 19 are views for explaining a correspondence between positions of the objective pixels, to which the equal-width line corresponding process is applied, and the states of the output buffer 32. In the upper portions of FIGS. 17 to 19, the positions (denoted by the marks x) of the objective pixels in the line drawing C are shown, and in the lower portion, the states of the portions 32 of the output buffer 32 corresponding to the line drawing C are shown. The line drawing C is constructed with the cyan color pixels of 6 (horizontal)×14 (vertical) so that the equal-width line corresponding process can be applied. As time elapses, the states transitioned from the left end state (state 3a) to the right end state (state 3e) in FIG. 17; the states are transitioned from the left end state (state 3f) to the right end state (state 3j) in FIG. 18; and the states are transitioned from the left end state (state 3k) to the right end state (state 3n) in FIG. 19. In addition, in FIGS. 17 to 19, for simplifying the later description, the entire pixels are set to have the maximum concentration.

In the case where the objective pixel is moved to be located at the position represented by the state 3b of FIG. 17, there is no cyan color pixel at the upper and left sides, so that U=0 and L=0. Although there are 5 pixels at the right side and 13 pixels at the lower side, since the maximum values thereof are 4, the calculation for R and D stops in the middle thereof, so that R=4, D=4. Since it is determined in Step S208 of FIG. 3 that the value of U+D+1 is equal to the value of L+R+1, the process proceeds to the equal-width line corresponding process of Step S214. Although the real line widths are not equal, in the case where the vertical width and the horizontal width are sufficiently wide, the output of which blurring is suppressed can be obtained by outputting the two end pixels with the dot sizes according to the distances from the edge. Since the process for the end portions is performed by using Step S510 of the equal-width line corresponding process, the process can proceeds to the equal-width line corresponding process without problems.

According to the equal-width line corresponding process of FIG. 16, it is determined in Step S504 that U+D+1=5>4, and it is determined in Step S508 that the shortest distance MIN=0<2. Therefore, the process proceeds to Step S510. In Step S510, since MIN=0, the S size is recorded (state 3b of FIG. 17).

Next, in the case where the objective pixel is moved by one pixel rightward from the state 3b of FIG. 17 to be in the state 3c of FIG. 17, U=0, L=1, R=4, and D=4. Since the value of U+D+1 is not equal to the value of L+R+1 but U+D+1<L+R+1, the horizontal line corresponding process is applied to the pixel. Although the real line is the vertical line of which horizontal width is narrow, the vertical width and the horizontal width are sufficiently wide and only the end portions are processed. Therefore, even though the line is determined to be the horizontal line, there is no problem. In the horizontal line corresponding process of FIG. 12, firstly, it is determined in Step S402 that U+D+1=5>4; it is determined in Step S406 that D=4>U=0; and it is determined in Step S414 that U=0<2. Therefore, the process proceeds to Step S416. In Step S416, since U=0, the S size is recorded (state 3c of FIG. 17).

The objective pixel is sequentially moved rightwards, and the horizontal line corresponding process is applied to the remaining pixels of the first row excluding the rightmost pixel, so that U=0. Therefore, in Step S416, the S size is recorded. With respect to the rightmost pixel having the state 3d, since U=0, L=4, R=0, and D=4, the equal-width line corresponding process is applied. According to the equal-width line corresponding process of FIG. 16, it is determined in Step S504 that U+D+1=5>4, and it is determined in Step S508 that the shortest distance MIN=0<2. Therefore, the process proceeds to Step S510. In Step S510, since MIN=0, the S size is recorded (state 3d of FIG. 17).

Next, in the case where the objective pixel is moved by one lower line to be in the state 3e of FIG. 17, U=1, L=0, R=4, and D=4. Since U+D+1=6 is larger than L+R+1=5, the vertical line corresponding process is applied to the pixel. In the vertical line corresponding process of FIG. 11, firstly, it is determined in Step S302 that L+R+1=5>4; it is determined in Step S306 that R=4>L=0; and it is determined in Step S314 that L=0<2. Therefore, the process proceeds to Step S316. In Step S316, since L=0, the S size is recorded (state 3e of FIG. 17).

Next, in the case where the objective pixel is moved by one pixel rightwards from the state 3e of FIG. 17 to the state 3f of FIG. 18, U=1, L=1, R=4, and D=4. Since the value of U+D+1 is equal to the value of L+R+1, the equal-width line corresponding process is applied. According to the equal-width line corresponding process of FIG. 16, it is determined in Step S504 that U+D+1=6>4, and it is determined in Step S508 that the shortest distance MIN=1<2. Therefore, the process proceeds to Step S510. In Step S510, since MIN=1, the M size is recorded (state 3f of FIG. 18).

The objective pixel is sequentially moved rightwards from the state 3f of FIG. 18, and the horizontal line corresponding process is applied to the remaining pixels of the second row excluding the rightmost pixel, so that MIN=1. Therefore, in Step S510, the M size is recorded. After that, one of the equal-width line corresponding process, the vertical line corresponding process, and the horizontal line corresponding process is sequentially applied to the rightmost pixel having the state 3g of the second row, the leftmost pixel having the state 3h of the third row, and the second pixel having the state 3i from the left end of the third row. Therefore, the dot having the size corresponding to the shortest distance from the edge is recorded in the output buffer 32.

Next, if the objective pixel is moved to the position represented by the state 3j of FIG. 18, it is obtained that U=2, L=2, R=3, and D=4, so that U+D+1>L+R+1. Therefore, the vertical line corresponding process is applied to the objective pixel. In the vertical line corresponding process (FIG. 11), in the case where L+R+1=6, the process proceeds to Step S306. In the case where R=3>L=2, the process proceeds to Step S314. In the case where L is 2, since L is not less than 2, the process proceeds to Step S312. In Step S312, the halftone process is performed on the objective pixel, so that the dot having the S size determined by the halftone process is recorded in the output buffer 32 (in the state 3j of FIG. 18).

In the case where the objective pixel is moved by one pixel rightwards from the state 3j of FIG. 18 to be in the state 3k of FIG. 19, U=2, L=3, R=2, and D=4. Since U+D+1>L+R+1, the vertical line corresponding process is applied to the objective pixel. In the vertical line corresponding process (FIG. 11), in the case where L+R+1=6, the process proceeds to Step S306. In the case where R=2<L=3, the process proceeds to Step S308. In the case where R is 2, since R is not less than 2, the process proceeds to Step S312. In Step S312, the halftone process is performed on the objective pixel, so that the dot having the M size determined by the halftone process is recorded in the output buffer 32 (in the state 3k of FIG. 19).

After that, the movement of the objective pixel and the dot formed state determination according to the method according to the result of determination of the objective pixel are repetitively performed, so that the states of the output buffer 32 are transitioned to the state 3l, the state 3m, and the state 3n as shown in FIG. 19.

Therefore, according to the printing system 1000 of the embodiment, the dot allocation is performed so that the dots having small non-uniformity of size are formed at the printing pixels constituting the edge portion. Accordingly, the mixture of the dots having a large difference in size (for example, L size and S size) or the occurrence of voids can be suppressed. As a result, at the time of printing an image by the printer 200, the blurring or voids in the edge is suppressed, so that the printing quality can be improved.

Figures 20A, 20B, 20C:
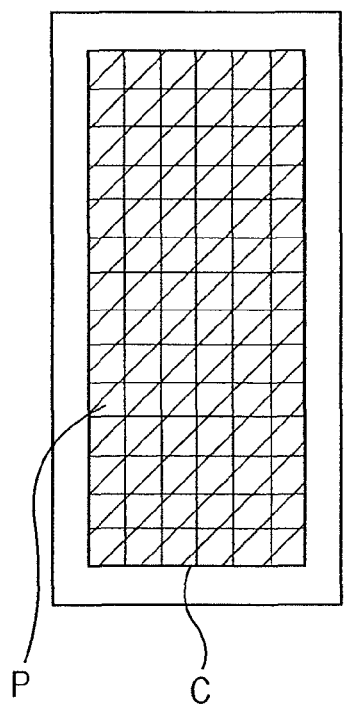
FIGS. 20A to 20C are views for explaining the effects of the first embodiment.

FIGS. 20A to 20B shows the states of the output buffer 32 that are obtained by the dot formed state determination process that are configured in the aforementioned embodiment. FIG. 20A shows an example of a to-be-printed image. The to-be-printed image has a line drawing C. FIG. 20B shows dot data that are obtained by performing an imaging process on the to-be-printed image according to an imaging process method in the related art. Here, "the imaging process method in the related art" means that only the halftone process is performed. FIG. 20C shows states of the output buffer 32 that are obtained by the dot formed state determination process according to the embodiment.

In the dot pattern shown in FIG. 20B, the printing pixel of the fifth row from the lowest row in the rightmost column and the state the printing pixel of the lowest row in the rightmost column are in the states where no dot is formed. In addition, the dots having the different sizes, that is, the L size, the M size, and the S size are mixedly formed at the printing pixels constituting the edge portion. On the other hand, as shown in FIG. 20C, at the time of printing an image by the printer 200, with respect to the pixels in the edge portion, at which the L dots are formed by the imaging process in the related art, that is, the maximum concentration pixels, the S dots are formed at the printing pixels corresponding to the edge pixels, and the M dots are formed at the printing pixel corresponding to the edge adjacent pixel. Among the pixels located at the edge, the pixels that do not have the maximum concentration are formed with the dots having the sizes that are determined by the normal halftone process. In addition, the dot formed states of the printing pixels corresponding to the normally processed pixels, of which distance from the edge is larger than 2, are determined by the normal halftone process.

In addition, according to the printing system 1000 of the embodiment, the determination of the edge area pixel for each color component and the formation of the dots having the predetermined sizes can be performed on the color-converted intermediate image that is generated for each color component corresponding to the ink colors. For example, in FIG. 4, $P_{24}$=RGB (182, 0, 129) and the color-converted $Q_{24}$ corresponding to the $P_{24}$ is CMYK (30, 100, 0, 0). In other words, the cyan dots and the magenta dots are formed at the printing pixels corresponding to $P_{24}$ on the printing medium, so that the color of $P_{24}$ is reproduced. In the imaging process in the related art, since $QC_{24}$=30% and $QM_{24}$=100%, the cyan color dots having the S or M sizes and the magenta color dots having the L sizes are formed at the printing pixels corresponding to $P_{24}$ by the halftone process. On the other hand, according to the imaging process (individual ink color process) of the embodiment, $QC_{24}$=30%≈maximum concentration 100%. With respect to $QC_{24}$, the dot formed states of the normally processed pixels are determined by the halftone process, so that the cyan color dots having the S or M size are formed. On the other hand, since $QM_{24}$=100%=maximum concentration 100%, with respect to $QM_{24}$, the consecutive number of the non-minimum concentration pixels is counted, so that the sizes of the dots are determined to be the S or M size by one of the vertical line corresponding process, the horizontal line corresponding process, and the equal-width line corresponding process. Since $QY_{24}$, and $QK_{24}$ are 0%, the dot formed states of the normally processed pixels are determined by the halftone process so that no dot is formed. Therefore, with respect to the color-converted intermediate image, as described above, in the case where the printing pixel included in the edge area pixels has the values of magenta 100% and cyan 30%, according to the imaging process in the related art, the magenta color dot having the L size is formed. The magenta ink is bleeding, so that the image quality may deteriorate. Accordingly to the embodiment, since the magenta color dot having the S or M size is formed, the bleeding of the magenta component in the edge can be suppressed, so that an accuracy of reproducing the edge can be improved.

In addition, in general, in the case where the dot formed state is determined by performing the edge determination on the image expressed in the RGB colorimetric system, the ink usage ratio is changed according to the modification of the lookup table (LUT) used for the color conversion process. Therefore, the conditions of the edge determination for the image expressed in the RGB colorimetric system need to be modified, so that there is a problem in that the number of design processes is increased. According to the printing system 1000 of the embodiment, the edge determination is performed based on the color-converted intermediate image expressed by ink concentrations, so that the increase in the number of design processes can be avoided.

In addition, in the case where the process of determining the dot formed state by performing the edge determination on the image expressed in the RGB colorimetric system is mounted in another printer of which the number of usage inks is different, there is a problem in that a design of a data structure for transmitting information of edge determined based on the RGB data to later-stage modules needs to be changed according to the number of usage inks (combination of inks) of the printer. According to the printing system 1000 of the embodiment, since the edge determination is performed on the color-converted intermediate image, the problem of design change can be avoided.

In addition, it is generally known that the highly-visible color bleeding or blurring in the edge in the main scan direction in which the print head is moved and in the sub scan direction in which the printing medium is transported is perceived by a human's eyes. According to the printing system 1000 of the embodiment, the pixels constituting the edge in the main scan direction and the sub scan direction are detected as the edge pixels, so that the dots excluding a relatively-large-sized dot (L dot) can be allocated. Accordingly, the highly-visible color bleeding of the dots in the edge portion can be suppressed.

In addition, according to the printing system 1000 of the embodiment, the dots having the sizes that are determined according to the distances from the edge pixels among the dots having a plurality of sizes can be allocated to the edge adjacent pixels. Therefore, the dots having almost uniform size can be formed at the edge adjacent pixels so as to be aligned. Accordingly, the blurring or voids in the edge area constructed with the edge pixels and the edge adjacent pixels can be suppressed, so that the printing quality can be improved.

In addition, according to the dot formed state determination process, the dot formed states of the printing pixels corresponding to the portions of the to-be-printed-image of which line width is less than the value of 4, for example, the portions of the line drawings A and B are determined as shown in FIGS. 8 and 15. In other words, the dot pattern corresponding to the distance of the objective pixel from the edge in the narrow direction of the line drawing, that is, the line width direction is designed to be generated. Therefore, unique dot size can be allocated to the fine line portion of which line width is equal to or less than a predetermined value. Therefore, the dots having small sizes can be allocated, so that the fine line portion can be prevented from being further narrowed (thinned). Accordingly, the printing quality can be further improved.

Particularly, in the embodiment, since the pattern of dot sizes are determined by setting the line width direction of the line drawing, that is, the narrow direction among the vertical and horizontal direction as a priority direction, the same dot sizes are relatively continuously output in the longitudinal direction. As a result, the edge can be more smoothly printed.

In addition, in the embodiment, the dot formed states of the normal pixels, which do not correspond to the edge area pixels, are determined by the halftone process. Therefore, with respect to the normal pixels, a total amount of ink per unit area of the printing medium can be limited. Accordingly, the occurrence of the color bleeding can be suppressed, so that the printing quality can be improved.

In addition, according to the dot formed state determination process, since the sizes of the dots allocated to the pixels are determined without depending on the result of the process for the adjacent pixels, a parallel process can be easily performed by the dual-core processor of the CPU in the embodiment. As a result, the processing speed can be greatly improved.

B. Modified Examples (1) Although the dot formed state determination process for improving the printing quality in the edge is described with respect to an image constructed with a plurality of colors in the embodiment, the invention may be adapted to the dot formed state determination process for improving the printing quality in the edge in the colors of the dots, which is performed on an image that is constructed with white and only one of the colors of dots used for printing the image (for example, cyan, magenta, or yellow). In addition, with respect to a color image including intermediate colors, the invention may be configured to be adapted to an image of each color at the time of processing the image of each color.

(2) Although the allocation of the dots having predetermined sizes are performed based on whether or not the objective pixel has the maximum concentration in the embodiment, the allocation of the dots may be performed based on, for example, whether or not the concentration of the objective pixel is equal to or more than a predetermined concentration. For example, with respect to the concentration of the objective pixel, the concentration, in which the dots having the L size are formed in the normal halftone process, may be set as a threshold value of determination of whether or not the allocation of the dots having the predetermined sizes is performed (Step S202). In addition, the allocation of the dots having the predetermined sizes may be performed based on whether or not the objective pixel is the non-minimum concentration. As a result, all the pixels located at the edge of the image can be determined to be the edge pixels, so that the deviation in the dot formed state can be further suppressed.

(3) In the embodiment, the halftone processing unit 26 performs the halftone process by using a threshold value process using a dither matrix. Alternatively, the halftone processing unit 26 may have the configuration of performing the halftone process by using a concentration pattern method, an error diffusion method (ED method), or other methods. In addition, a configuration of determining the dot formed states by using the well-known halftone process method added with other particular processes may be used as the halftone processing unit.

(4) Although each dot pattern for each line width, which is configured by the dot allocation unit 27, is determined so that the size is enlarged as the distance from the edge is increased in the embodiment, the invention is not necessarily limited thereto. Any type of the dot patterns that are determined based on the line width may be used. In addition, although the direction of allocation is configured so that the dot pattern corresponding to the distance of the objective pixel from the edge in the narrow direction among the vertical and horizontal directions of the line drawing is generated, the dot pattern corresponding to the distance of the objective pixel from the edge in the non-narrow direction may be generated.

(5) In addition, the sizes of the dots that can be allocated by the dot allocation unit 27 are not necessarily limited to the embodiment. A configuration of allocating the dots having other sizes, for example, a configuration of allocating S dots even in the case of the distance from the edge being the value of 1 or 2 may be used. It is preferable that the dots excluding the dots having the largest size (L dots) among the dots having a plurality of sizes used for printing are allocated to the printing pixels corresponding to the edge area pixels. Accordingly, the color bleeding or plumping in the edge portion can be efficiently suppressed, so that the printing quality can be further improved.

(6) Although the CPU is the dual-core processor in the embodiment, the CPU may be a multi-core processor of which the number of cores is 3, 4, or others.

(7) The edge area determination unit 23 performs the determination of the edge pixels by determining whether or not at least one of four adjacent pixels adjacent to the objective pixel in the up, down, left, and right directions is white in the embodiment. Alternatively, the edge area determination unit 23 may have the configuration of determining whether or not at least one of eight adjacent pixels adjacent to the objective pixel in the up, down, left, right, upper left, lower left, upper right, and lower right directions is white. In addition, the edge area determination unit 23 may have the configuration of the determination of the edge adjacent pixels by determining whether or not at least one of eight pixels, of which distances from the edge have value of 2 in the eight directions, that is, in the up, down, left, right, upper left, lower left, upper right, and lower right directions of the objective pixel instead of the up, down, left, and right direction of the objective pixel is white.

(8) Although the dot formed state determination process is performed on the entire intermediate image 40 in the same method in the embodiment, the dot formed state determination may be performed only on a text area including characters or line drawings (symbol, figure, graph, or the like) in the intermediate image 40 in the method according to the embodiment. In this case, for example, the text area may be detected based on the RGB value of the image. In addition, the text area may be detected based on a value of brightness of the pixel.

(9) Although the image is the RGB data in the embodiment, the image is not necessarily the RGB data. In addition, although the printer 200 performs printing by forming dots having the three types of sizes by using inks of four colors, that is, CMYK in the aforementioned embodiment, the printer 200 may perform printing by using inks of other colors excluding CMYK or by forming dots having the two types (or four or more types) of sizes. Even in this case, the edge determination and the dot allocation are performed on the intermediate image for each color component, which are obtained by color-converting the image representing the original image to the intermediate image in the colorimetric system that can be processed by the printing apparatus, the same effects as the embodiment can be obtained.

(10) Although the imaging process apparatus is configured as the personal computer 100 in the embodiment, the invention may be adapted to an imaging process apparatus that performs an imaging process of determining dot formed states besides the personal computer 100. For example, the imaging process apparatus may be configured as a printer.

(11) In addition, in the embodiment, some portion of the configuration implemented in hardware may be replaced with software. To the contrary, some portion of the configuration implemented in software may be replaced with hardware.

(12) Although an example of printer, in which the head for ejecting ink on the printing medium is moved in the main scan direction, is described in the embodiment, a line head printer, in which a plurality of heads may be disposed in parallel so as for the heads not to be moved, may be adapted.

(13) Although the setting of the objective pixel (Step S104 of FIG. 2) is performed on the color-converted intermediate image (Step S102) in the embodiment, the setting may be performed on, for example, a resolution-converted image. In addition, the setting may be performed on the resolution-converted image in units of band. In addition, although the color conversion process is performed on the entire resolution-converted image, for example, the color conversion process may be performed so that the intermediate pixels that are necessary and sufficient for determining the edge can be generated.

(14) Although the individual ink color processes are performed in the order of C, M, Y, and K in the embodiment, the order may be arbitrarily set. For example, the order may be changed according to the specification of the head unit 250.

(15) In the embodiment, the change in the dot size may be implemented, for example, by changing an amount of ink droplet per one time or by changing the number of ejections needed for forming one dot.

(16) In the embodiment, an off carriage, in which an ink cartridge is not supported on the carriage of the carriage unit 260, may be adapted.

(17) Although the dual-core CPU 110 is used in the embodiment, a single CPU may be used.

Hereinbefore, various embodiments of the invention are described, but the invention is not limited to the embodiments. Various changes and modifications can be made without departing the sprit of the invention.

The entire disclosure of Japanese Patent Application No. 2008-302383, filed Nov. 27, 2008 is expressly incorporated by reference herein.

What is claimed is:
1. A printing apparatus that prints an image of a first colorimetric system that is constructed with a plurality of pixels by using dots having a plurality of sizes, comprising:
a print head that ejects a printing material to form the dots on a printing medium;
a color conversion unit that converts the image in the first colorimetric system to an intermediate image in a second colorimetric system that can be printed by the printing apparatus;
a detection unit that detects:
edge pixels, which constitute an edge of the intermediate image, among a plurality of pixels constituting the intermediate image, and
edge adjacent pixels, on which the dots are formed and which are located in a predetermined distance from the edge pixels, among the plurality of pixels constituting the intermediate image;
a dot allocation unit that allocates:
dots having a predetermined size among the dots having the plurality of sizes to the edge pixels, and
dots having a size, which is defined according to a distance from the edge pixels, among the dots of a plurality of sizes to the edge adjacent pixels; and
a printing unit that controls the print head based on printing data indicating the dot allocation to form the image on the printing medium.

2. The printing apparatus according to claim 1,
   wherein the second colorimetric system is configured with a plurality of color components that are used to print by the printing apparatus,
   wherein the color conversion unit generates the intermediate image for each color component,
   wherein the detection unit detects the edge pixels for each color component, and
   wherein the dot allocation unit allocates the dots having the predetermined size to the edge pixels for each color component.

3. The printing apparatus according to claim 2, wherein the detection unit detects pixels having a predetermined concentration, which is defined for each color component in advance, among the plurality of pixels constituting the intermediate image as the edge pixels.

4. The printing apparatus according to claim 1,
   wherein at least one of the print head ejecting the printing material and the printing medium is allowed to be moved in a predetermined direction, so that the image is formed on the printing medium, and
   wherein the detection unit detects the edge pixels, which constitute an edge in the predetermined direction and a direction intersecting the predetermined direction, among the pixels constituting the intermediate image.

5. The printing apparatus according to claim 1, wherein the dot allocation unit allocates dots to pixels excluding the edge pixels and the edge adjacent pixels among the plurality of pixels constituting the intermediate image by using a halftone process.

6. The printing apparatus according to claim 1,
   wherein at least one of the print head ejecting the printing material and the printing medium is allowed to be moved in a predetermined direction, so that the image is formed on the printing medium,
   wherein the second colorimetric system is configured with a plurality of color components that are used to print by the printing apparatus,
   wherein the color conversion unit generates the intermediate image for each color component,
   wherein the detection unit detects the edge pixels among the plurality of pixels constituting the intermediate image for each color component, the edge pixels having a predetermined concentration, which is defined for each color component in advance, and constituting an edge in the predetermined direction and a direction intersecting the predetermined direction,
   wherein the dot allocation unit allocates the dots having the predetermined size to the edge pixels for each color component,
   wherein the detection unit detects edge adjacent pixels, on which the dots are formed and which are located in a predetermined distance from the edge pixels, among the plurality of pixels constituting the intermediate image for each color component,
   wherein the dot allocation unit allocates dots having a size, which is defined according to a distance from the edge pixels, among the dots of a plurality of sizes to the edge adjacent pixels for each color component, and
   wherein the dot allocation unit allocates dots to pixels excluding the edge pixels and the edge adjacent pixels among the plurality of pixels constituting the intermediate image by using a halftone process.

7. A printing method using a printing apparatus which prints an image of a first colorimetric system that is constructed with a plurality of pixels by using dots having a plurality of sizes, comprising:
   converting the image in the first colorimetric system to an intermediate image in a second colorimetric system that can be printed by the printing apparatus;
   detecting edge pixels, which constitutes an edge of the intermediate image, among a plurality of pixels constituting the intermediate image;
   detecting edge adjacent pixels, on which the dots are formed and which are located in a predetermined distance from the edge pixels, among the plurality of pixels constituting the intermediate image;
   allocating dots having a predetermined size among the dots having the plurality of sizes to the edge pixels; and
   allocating dots having a size, which is defined according to a distance from the edge pixels, among the dots of a plurality of sizes to the edge adjacent pixels.

* * * * *